United States Patent [19]

Shelomentsev et al.

[11] 4,452,074

[45] Jun. 5, 1984

[54] METHOD OF AND APPARATUS FOR MONITORING THE PERFORMANCE OF INTERNAL COMBUSTION ENGINE MECHANISMS

[76] Inventors: Timofei I. Shelomentsev, Leninsky prospekt, 91, kv. 71; Vladimir A. Konstantinov, ulitsa Kazintsa, 76, kv. 610; Evgeny V. Yakubovich, ulitsa Asanalieva, 7, kv. 217; Fedor F. Bratsky, ulitsa Tikotskogo, 42, kv. 119; Leonid I. Geraschenko, ulitsa Gurtieva, 18, kv. 38; Olga P. Shevchuk, ulitsa Vasnetsova, 37, kv. 2; Alexandr N. Murashko, ulitsa Gorkogo, 143, kv. 50; Vasily I. Lutsky, Krasnozvezdnaya ulitsa, 1-a, kv. 22; Vladimir P. Nekrashevich, ulitsa Glebki, 84, kv. 75; Alexandr M. Boglov, ulitsa Gurtieva, 12, kv. 10; Valery P. Muraviev, ulitsa Ya Mavra, 18, kv. 159; Evgeny L. Shildkrot, ulitsa Vaneeva, 20, kv. 53, all of Minsk; Vladimir A. Scherbatjuk, ulitsa Stroitelei, 11, kv. 50, Molodechno, all of U.S.S.R.

[21] Appl. No.: 400,679

[22] Filed: Jul. 22, 1982

[51] Int. Cl.³ ............................................. G01M 15/00
[52] U.S. Cl. .................................... 73/119 A; 73/660
[58] Field of Search ...................... 73/119 A, 596, 627, 73/660, 579; 239/533.2

[56] References Cited

U.S. PATENT DOCUMENTS 4,213,346 7/1980 Polovnikov et al. ................. 73/660
4,354,380 10/1980 Murata ............................. 73/119 A

OTHER PUBLICATIONS

Ermolov, I. R. S. et al., Electromeasuring Facilities for Diagnosis of Machines and Mechanisms, Leningrad, Energia Publishing House, 1979, pp. 86-87.
Pavlov, B. V., Acoustical Diagnosis of Mechanisms, Moscow, Mashinostroenie Publishing House, 1971, pp. 169-171 and 180-181.

Primary Examiner—Jerry W. Myracle
Attorney, Agent, or Firm—Burgess, Ryan & Wayne

[57] ABSTRACT

Disclosed is a method comprising the steps of applying ultrasonic mechanical oscillations across the body of a mechanism being monitored to the chosen moving element of the mechanism, receiving and converting into an electrical signal the ultrasonic oscillations received from the chosen element and modulated as a consequence of the motion performed by the element, isolating from the electrical signal a modulated carrier frequency equal to the frequency of the oscillation being applied, detecting the isolated frequency so as to obtain a low-frequency intelligence signal characterizing the motion performed by the chosen element, and determining the performance characteristics of the mechanism being monitored on the basis of the measured spectral-time parameters of the intelligence signal. Disclosed is an apparatus for practicing the foregoing method comprising an electrical generator connected to a transmitting electromechanical converter arranged on the body of the mechanism being monitored, upon which also arranged is a receiving electromechanical converter connected to a band-pass filter, a detector, a low-frequency amplifier and a meter of the amplitude-time parameters of the intelligence signal connected in series.

30 Claims, 17 Drawing Figures

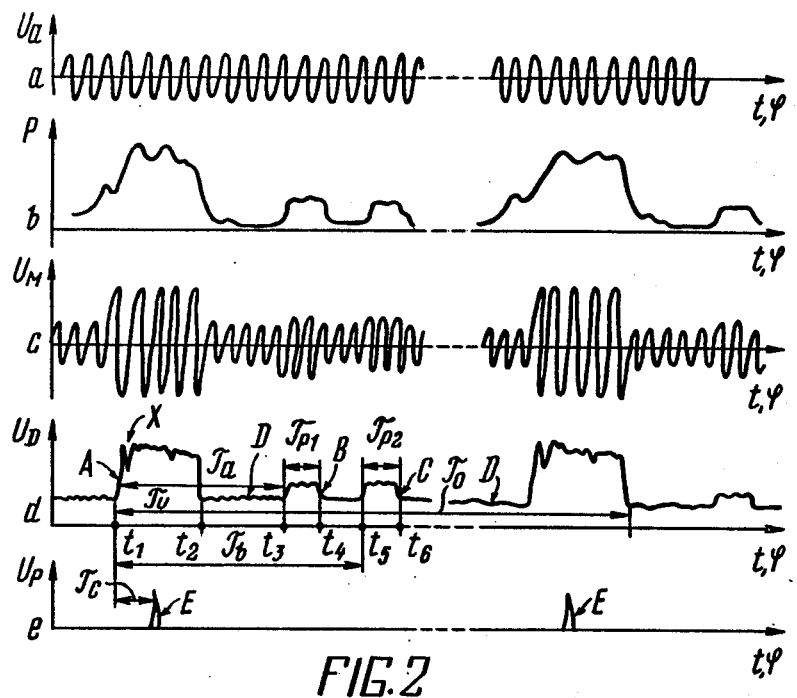
FIG.2
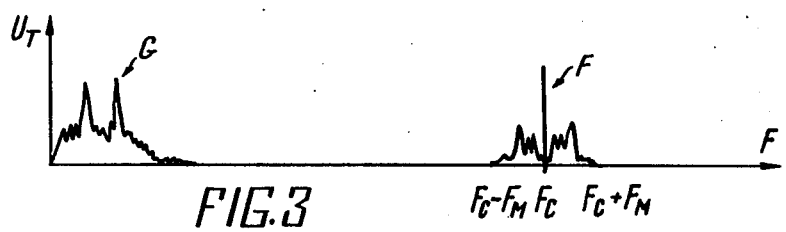
FIG.3
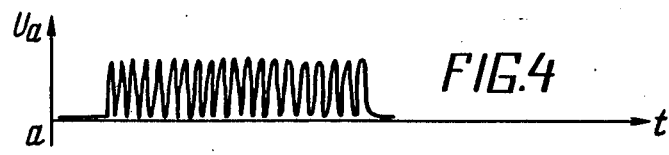
FIG.4

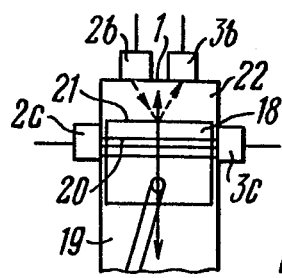
FIG.5
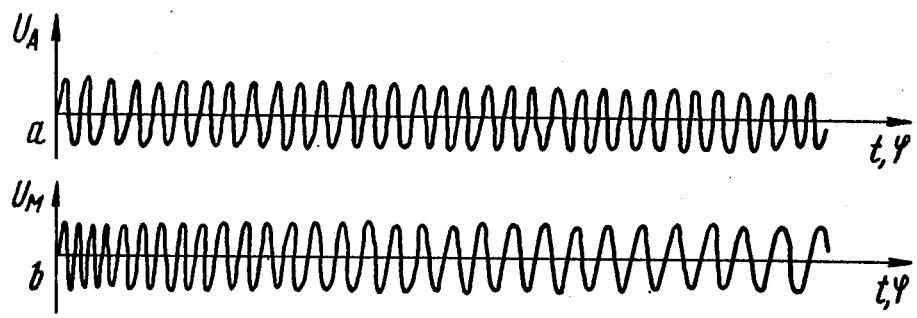
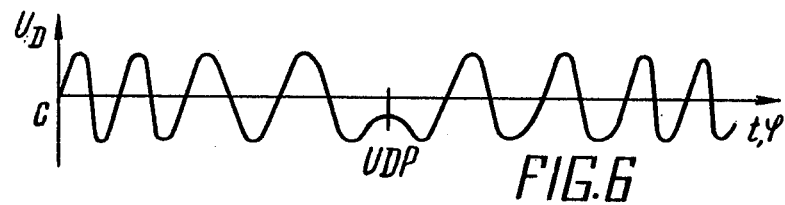
FIG.6
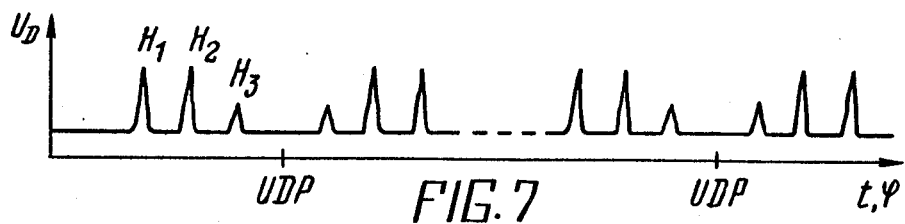
FIG.7

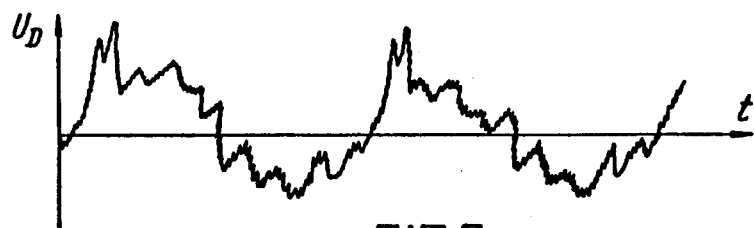
FIG.9
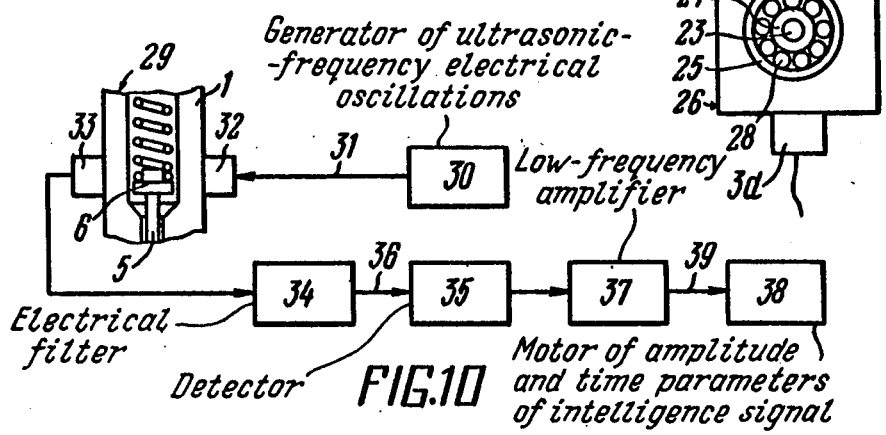
FIG.8
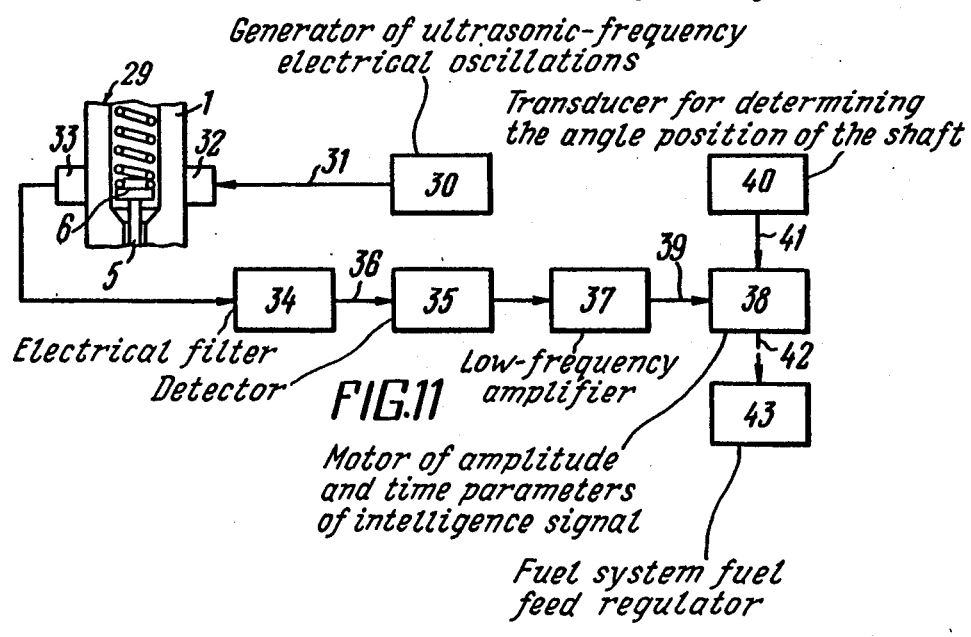

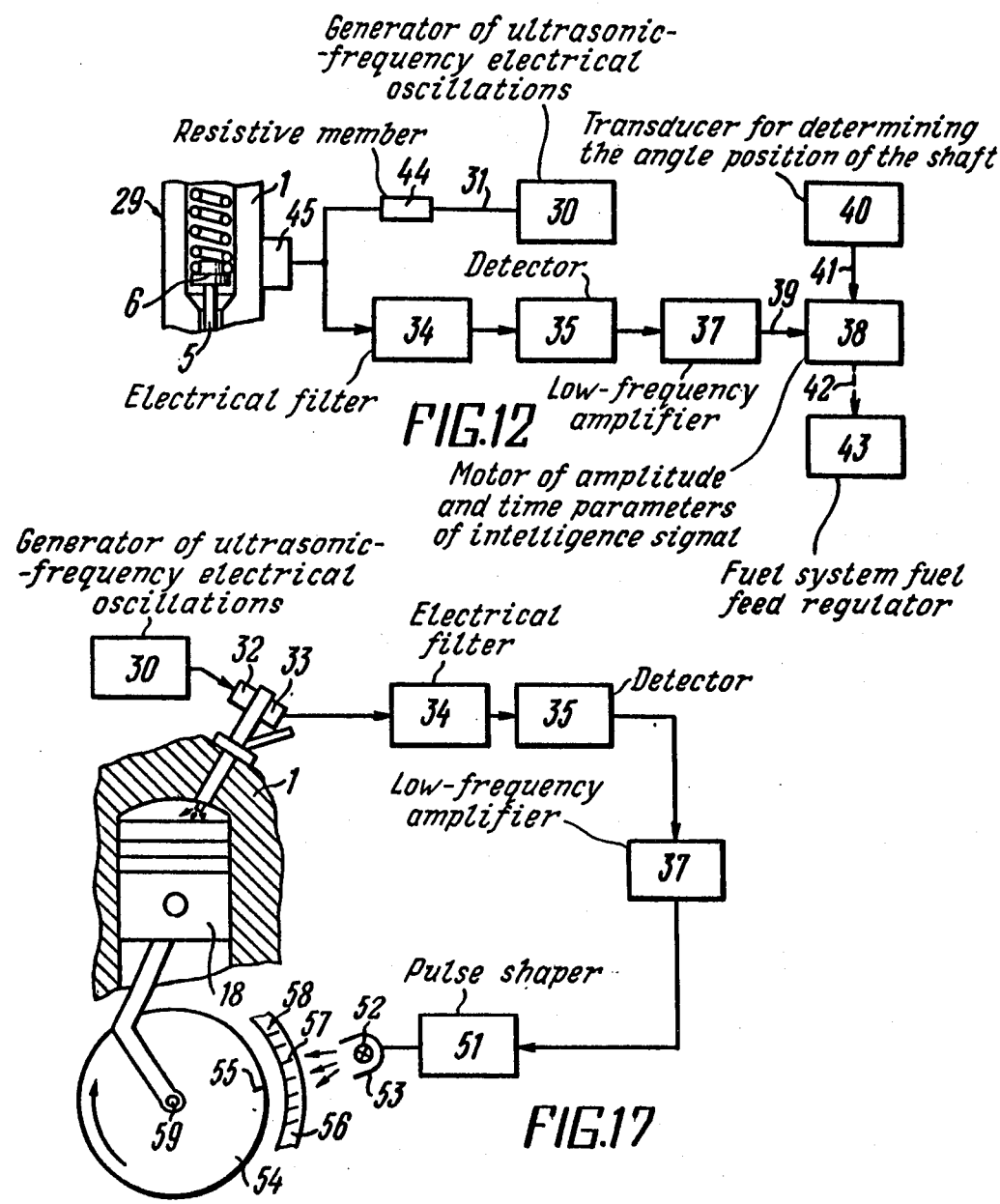

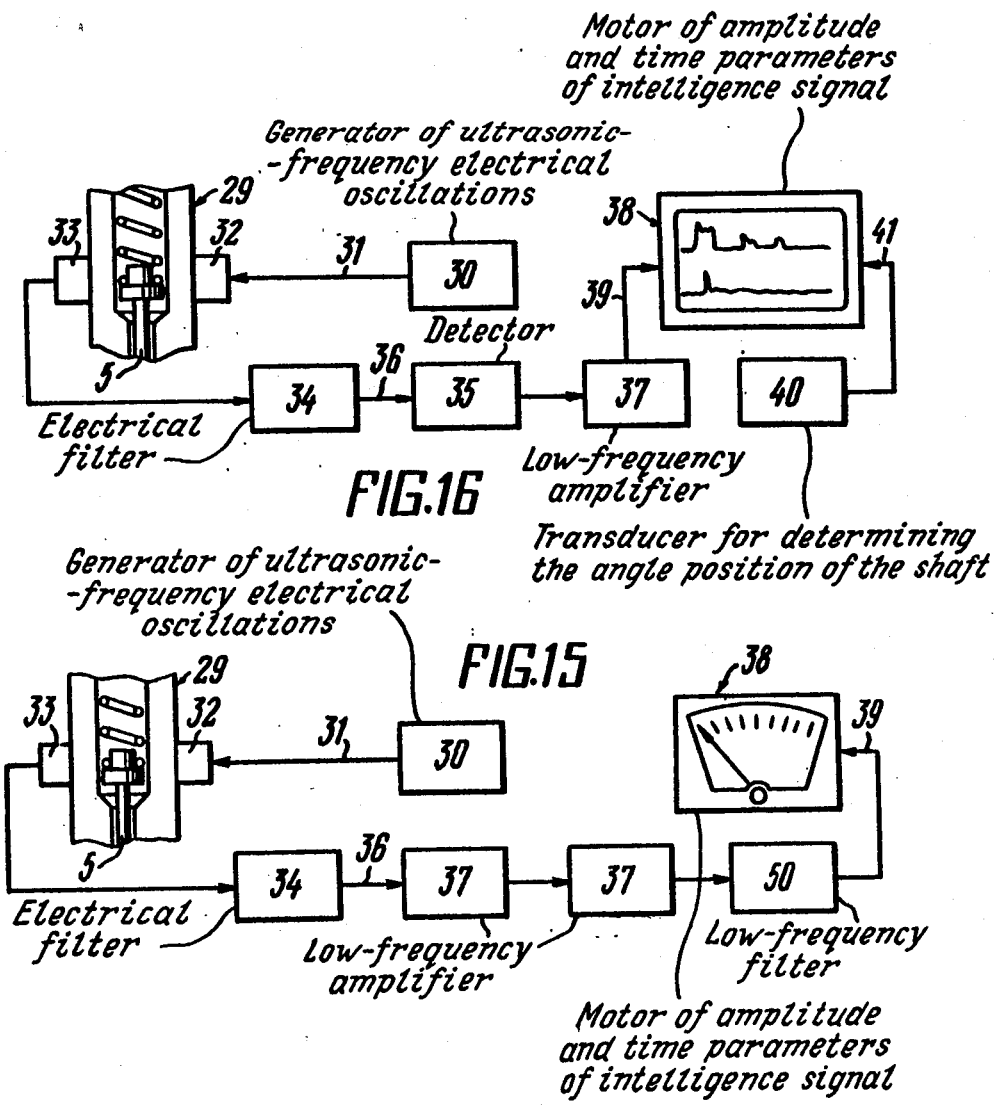

METHOD OF AND APPARATUS FOR MONITORING THE PERFORMANCE OF INTERNAL COMBUSTION ENGINE MECHANISMS

FIELD OF THE INVENTION

The present invention relates in general to the technique for testing and diagnosis of machines and engines, and more specifically is concerned with methods of and apparatus for monitoring the performance of internal combustion engine mechanisms.

The present invention may find extensive application in the manufacture, operation and maintenance of internal combustion engines of various constructions and designations. The present invention may be utilized to the utmost advantage in the operation and maintenance of diesel engines, particularly diesel engines of transportation facilities, such as automobiles and tractors.

DESCRIPTION OF THE PRIOR ART

It is a matter of general experience that the problem of improving the capacity, reliability and economical efficiency of internal combustion engines has recently become one of the first-priority engineering issues. The effective monitoring exercised in the operation of internal combustion engines as well as the introduction of special-purpose instrumentation to determine fairly quickly and accurately the serviceability of operating mechanisms into the service practice of these engines make it possible to take correct decisions about the time and content of prophylactic operations and repair. One of the principal mechanisms of a diesel engine is its fuel system. As is known, the capacity and economical efficiency as well as the longevity of a diesel engine are determined to a great extent by the adequate establishment of the moment of injecting fuel into the combustion chamber in relation to the top dead centre of the piston, the duration of fuel injection, the quality of fuel spraying and the number and duration of secondary fuel injections. The fast and accurate measuring of fuel injection parameters allows not only to effectively monitor the serviceability of $\eta$ the engine fuel system, but also to control the procedure of fuel injection depending on the load applied to the engine, its rotational speed and so forth. The present invention is directed at improving the quality and expediteness of monitoring the operation of internal combustion engine mechanisms, and first of all its fuel system.

Known in the prior art is a method of monitoring the performance of internal combustion engine mechanisms, in particular the fuel system of a diesel engine (see, for example, R. S. Ermolov et al., Electromeasuring facilities for diagnosis of machines and mechanisms, Leningrad, "Energia" Publishing House, 1979, pp. 86–87), which ensures monitoring of the parameters of fuel injection into the engine cylinder. This method incorporates measuring the pressure of fuel in the high-pressure pipe-line and determining the time parameters of injection on the basis of the measuring data obtained. According to the method under consideration, pressure measurements are carried out by means of suitable electromechanical pressure transducers which convert pressure changes into an electrical signal and which are built into the pipe-line.

However, the above-mentioned prior art method is characterized by a comparatively low degree of accuracy in the determination of time injection parameters inasmuch as these parameters are found out rather on the basis of insufficiently quick changes in the pressure ensuring the injection of fuel by the engine injector than on the basis of performance data of the injector itself. The appraisal of performance of the mechanism checked is accomplished by the shape of a time diagram of the resulting electrical signal, but the adequate appraisal calls for the knowledge and differentiation of the distinctive features of this diagram inherent in each and every moving element of the mechanism being checked. This is why the reliability of checking data largely depends on the experience of the operator conducting the testing. Furthermore, the effectuation of fuel system performance monitoring according to the above method in a number of cases involves certain difficulties stemming from the specific nature of pressure measuring, which will be discussed in more detail hereinbelow.

By far the best in measuring accuracy and facility are methods of vibroacoustical monitoring of the performance of internal combustion engine mechanisms. One of such methods (see, for example, B. V. Pavlov, Acoustical diagnosis of mechanisms, Moscow, "Mashinostroenie" Publishing House, 1971, pp. 169–172), which is closely related in its technical essence to the present invention and identified as its prototype, enables one to directly determine the operational parameters of the mechanism to be checked. This method contemplates the reception and conversion into an electrical signal of the mechanical oscillations caused in the operation of some mechanisms of the engine to be checked by the co-impacts of the chosen moving and stationary elements of the mechanism, for example, injector elements. This operation is accomplished by some suitable means for receiving and converting mechanical oscillations, e.g., by a vibroacoustical transducer mounted on the body of the mechanism checked. Then there is performed the isolation from the received electrical signal of its component related to the chosen moving element of the mechanism being monitored. Subsequently, by means of processing the isolated electrical signal component, the spectral-time parameters of the received mechanical oscillations are determined. The resulting spectral-time parameters are employed then for the analysis of the performance of the mechanism checked. Thus, for example, using the vibro-acoustical oscillations of the injector body caused by the co-impacts of the injector needle and the sprayer or the injector limiter there are determined the time parameters of fuel injection, namely the beginning and the termination of fuel injection as well as the duration of injection.

However, in compliance with the above prior art method there is received an entire spectrum of the vibroacoustical oscillations caused both by the operation of all the moving elements of the mechanism checked and by the operation of the other mechanisms of the engine. For this reason on the signal carrying intelligence about the performance of the chosen moving element of the mechanism checked there are superposed interfering signals coming from other moving elements, which makes the isolation of a signal only from the chosen element quite a difficult matter. As a consequence, with the above method it is next to impossible to ensure a sufficiently high degree of reliability of the measuring results obtained.

Furthermore, the method under consideration does not allow to judge the behaviour of the moving but not coimpacting elements of this or that mechanism checked. The matter is that in the absence of co-impacts between the moving elements of the mechanism there occurs no vibroacoustical oscillations and for this reason if the motion of the element is not accompanied by impacts against the other elements, then it is practically impossible to determine with this method the character of the motion of the element in question. However, it is frequently necessary to know the peculiarities of the motion of some elements. For instance, by the character of the oscillating motions of the needle in the injector on starting up the engine one may judge the quality of fuel spraying in the engine cylinder.

Also known in the prior art are apparatus for monitoring the operating of internal combustion engine mechanisms in which the principles of the above-described methods are applied. One of such apparatus (see, for example, R. S. Ermolov, Electromeasuring apparatus for diagnosis of machines and mechanisms, "Energia" Publishing House, Leningrad, 1979, pp. 86–87) incorporates the method comprising measuring the pressure of fuel in the pipe-line of the engine fuel system. This apparatus comprises an electromechanical converter of the piezoelectrical type made in tubular form and converting a change in the pipe-line pressure into an electrical signal. During the testing of the fuel system this converter is mounted into a cavity specially provided for this purpose in the high-pressure pipe-line. The output of the converter via a low-frequency amplifier is connected to one of the inputs of a meter for identifying the parameters of the intelligence signal received. The other input of the meter is connected to a device which generates a signal characterizing the angular position of the engine crankshaft.

However, when mounting the converter into the cavity made in the high-pressure pipe-line leading to the injector of the engine fuel system it is necessary to perform each time the dismantling of this system, which damages the air-tightness of the high-pressure tract and thus may result in the clogging of the fuel system by various impurities which may find their way into the pipe-line, for example, during the mounting of the converter. Because of the comparatively low electrical characteristics displayed by the converter in use in the range of frequencies of the oscillations measured this converter must have fairly considerable dimensions, as a result of which in a number of cases certain difficulties tend to arise in the course of its installation. Having rather a bulky size, such a converter exerts additional influence of its own on the pressure changes being measured. Moreover, high pressure existing in the pipe-line makes the converter short-lived.

More convenient and simple in use is a variant of the apparatus just described hereinabove in which in the capacity of the electromechanical converter serves a strain-gauge transducer mounted directly on the pipe-line and sensing changes in the diameter of the pipe-line caused by the pressure changes occuring thereinside. This variant ensures removal of the influence of the converter on the measurements made as well as the simplification of the monitoring process. But, however, even in this case the converter is fairly cumbersome (about 20 millimeters) and should be secured onto the pipe-line at its portion which is to be obligatorily straight and properly dressed.

Furthermore, it is worthy of notice that in both of the variants of the above apparatus the converters must be installed on the pipe-line only in direct proximity to the fuel pump, otherwise in the course of making measurements errors may appear due to the time of propagation of a pressure wave in the pipe-line. A certain inconvenience resides in that for different engines and because of different standards for fuel pipe-line in various countries it becomes necessary in many cases to manufacture converters of a special design each time.

Also known in the prior art is an apparatus based on the vibroacoustical method of monitoring the performance of internal combustion mechanisms (see, for example, B. V. Pavlov, Acoustical diagnosis of mechanisms, Moscow, "Mashinostroenie" Publishing House, 1971, p. 181) which is closely related in its technical essence to the proposed apparatus and therefore identified as a prototype thereof. The apparatus under consideration comprises a receiving electromechanical converter which is installed directly on the body of the mechanism to be checked and serves for the reception of electrical oscillations containing an intelligence signal characterizing the vibrational motion of the chosen moving element of this mechanism. The output of the electromechanical converter is connected via an amplifier intended for the amplification of the electrical oscillations generated by the converter to the input of an electrical high-pass filter serving for the isolation from the electrical oscillations of a portion of their spectrum which is occupied by the intelligence signal. The apparatus also comprises a meter for measuring the amplitude and time parameters of the intelligence signal, one input of which is connected to the output of the electrical filter, while the other input thereof is connected to a transducer for identifying the angular position of the engine crankshaft, this transducer representing in particular a transducer of the top dead centre of the piston. The meter is provided with an indicator calibrated to read in angular units of the revolution of the crankshaft.

Despite the fact that the above apparatus ensures a higher degree of measuring accuracy as compared to the one disclosed hereinabove still the accuracy attained by it is insufficiently high. This is accountable to the fact that the intelligence signal from the chosen moving element is received in the presence of interferences coming from the operation of other moving elements both of the mechanism checked and other mechanisms of the engine. The power of the signals produced by many interferences is comparable to the power of the intelligence signal and the frequency of the interference signals is often close to the frequency of the intelligence signal. This is why the electrical filter serving for the isolation of the intelligence signal has a fairly complex design. This complexity is made even greater because that the signals received from the moving elements have a relatively low frequency in the order of hundreds and thousands of hertz. This fairly low frequency also accounts for the increased dimensions of the converters. The intelligence signal generated in the above-described apparatus has a rather low degree of informativeness since it carries only information about the co-impacts between the chosen moving element and the other elements of the mechanism checked rather than information about the character of the operational motion produced by this element. All this taken together makes the apparatus in question insufficiently convenient in use and does not ensure a high degree of reliability in measuring the operational parameters of the mechanism checked.

SUMMARY OF THE INVENTION

A primary object of the present invention is to provide a method of and an apparatus for monitoring the performance of internal combustion engine mechanisms enabling one to determine the performance characteristics of the mechanism being checked on the basis of measuring the motion parameters of some chosen element of this mechanism.

Another object of the present invention is to enhance the informativeness of a signal generated by such an apparatus and carrying information about the performance characteristics of the mechanism checked of the internal combustion engine.

Still another object of the present invention is to improve the quality of monitoring the performance of internal combustion engine mechanisms.

Still another object of the present invention is to decrease the time taken for monitoring the performance of internal combustion engine mechanisms.

Still another object of the present invention is to increase the accuracy of measurements made in the course of monitoring the performance of internal combustion engine mechanisms.

Still another object of the present invention is to raise the reliability of measurements made in the course of monitoring the performance of internal combustion engine mechanisms.

Still another object of the present invention is to raise the reliability of an apparatus for monitoring the performance of internal combustion engine mechanisms.

Still another object of the present invention is to enhance the noise immunity of an apparatus for monitoring the performance of internal combustion engine mechanisms.

Still another object of the present invention is to broaden the functional possibilities of an apparatus for monitoring the performance of internal combustion engine mechanisms.

Still another object of the present invention is to reduce the amount of labour required for arranging the process of monitoring the performance of internal combustion engine mechanisms.

Still another object of the present invention is to increase the convenience of performing the procedure of monitoring the performance of internal combustion engine mechanisms.

With these and other objects in view, there is provided a method of monitoring the performance of mechanisms of an internal combustion engine incorporating a cylinder with a piston, an injector and a fuel pump, comprising the steps of receiving and converting mechanical oscillations from a chosen moving element of the mechanism monitored into an electrical signal accomplished by a means for receiving and converting mounted on the body of the mechanism, isolating from the electrical signal a component belonging to the chosen moving element of the mechanism being monitored, measuring the spectral-time parameters of the received mechanical oscillations by means of processing the isolated component of the electrical signal and determining the required performance characteristics of the mechanism being monitored on the basis of the measured parameters, wherein, according to the invention, prior to the step of measuring the spectral-time parameters accomplished are the steps of applying continuous artificial mechanical oscillations of the ultrasonic range to the chosen moving element of the mechanism monitored across the body of said mechanism, receiving and converting into an electrical signal the ultrasonic material oscillations arriving from the chosen moving element of the mechanism being monitored, arising from the interaction of the artificial ultrasonic mechanical oscillations with the chosen moving element and modulated as a consequence of the motion performed by said element, isolating a band of frequencies of the electrical signal with a carrier frequency equal to the frequency of the artificial ultrasonic mechanical oscillations being applied detecting the isolated carrier frequency of the electrical signal for obtaining its low-frequency modulating component characterizing the motion performed by the chosen moving element in relation to the body of the mechanism being monitored and representing an intelligence signal, and subsequently accomplished is the step of measuring the spectral-time parameters of the received ultrasonic mechanical oscillations by means of processing the aforesaid intelligence signal.

Owing to the application of the ultrasonic oscillations to the chosen moving element of the mechanism being monitored, the proposed method of monitoring the performance of internal combustion engine mechanisms allows are to determine all the peculiarities of the operational and undesired motions produced by the chosen element including the character of contact of this element with the walls of the body of the mechanism being monitored and with the other elements of the mechanism to which it is connected. As a result of that the information about the motion of the chosen moving element of the mechanism being monitored is passed for processing at frequencies sharply differing from the frequencies of interfering vibrations of the mechanism. The intelligence signal produced with this method is characterized by a clear-out shape which ensures accurate measurements of the time and amplitude parameters of this signal, and on the basis of the measured values of these parameters, ensures accurate determinations of this or that required performance characteristics of the mechanism.

Another embodiment of the method for monitoring the performance of internal combustion engine mechanisms according to the present invention features receiving and converting the modulated ultrasonic oscillations passed through the mechanism being monitored with the chosen moving element located thereinside.

It is expedient to use the above-described embodiment of the proposed method in the simplest cases involving the arrangement of the mechanism being monitored on the engine, when the moving element chosen for tracing its motion is located inside that portion of the body of this mechanism which is disposed outside the body of the engine and when there is a possibility for easy external access to this portion of the body of the mechanism from two opposite sides. In other words, in those cases when there exists a possibility to position the means for generating ultrasonic mechanical oscillations in line with the means for receiving these oscillations, this line passing inside the aforesaid portion through the chosen moving element or its protruding parts.

Yet another embodiment of the method according to the present invention features receiving and converting the ultrasonic oscillations reflected from the chosen moving element located inside the mechanism being monitored.

It is expedient to use this embodiment of the proposed method in complex cases involving the arrangement of the mechanism being monitored on the engine when the chosen moving element is located inside that portion of the mechanism which is disposed deeply inside the body of the engine and when there is no possibility to install the applying means and the receiving means in one line crossing the chosen moving element.

Yet another embodiment of the method according to the present invention features receiving and converting the ultrasonic oscillations modulated as a consequence of variations in the mechanical impedance of the mechanism being monitored with the chosen moving element located thereinside.

It is expedient to use this embodiment of the proposed method in those cases when to the body of the mechanism being monitored there is external access only from one side thereof and when there is no possibility to install the applying means and the receiving means from both sides of this body, for example, in the case of a small mechanism.

Yet another embodiment of the method according to the present invention also features applying the artificial ultrasonic oscillations to the end portion of the needle or to the rod of the injector.

It is expedient to use this embodiment of the proposed method in those cases when in the course of monitoring the performance of the engine injector there is required to make the most accurate measurements of the parameters of fuel injection by the injector. In this embodiment a high degree of accuracy in measurements is ensured by the increased value of a signal-noise ratio for the intelligence signal received since in this case there takes place the increased depth of modulation of the artificial ultrasonic oscillations as a consequence of the complexity of the geometrical shape of the portions of the abovementioned moving elements to which these oscillations are applied.

Yet another embodiment of the method according to the present invention features applying the artificial ultrasonic oscillations to the chosen moving element of the mechanism being monitored on starting up the engine.

It is expedient to use this embodiment of the proposed method in those cases when it proves somewhat difficult to determine this or that performance characteristic of the mechanism being monitored in the operation of the engine. For example, in the case when it is necessary to assess the mobility of the engine injector needle and to determine thereby the quality of fuel spraying by the injector.

Yet another embodiment of the method according to the present invention features applying the artificial ultrasonic oscillations to the injector spring.

It is expedient to use this embodiment of the proposed method in the case when it is necessary to determine the integrity of the injector spring as well as the degree of preliminary compression of this spring.

Yet another embodiment of the method according to the present invention features applying the artificial ultrasonic oscillations to the bottom of the piston located inside the cylinder.

It is expedient to use this embodiment of the proposed method in the case when it is necessary to determine the speed of the piston motion in the engine cylinder or the position of the piston at this or that moment.

Yet another embodiment of the method according to the present invention features applying the artificial ultrasonic oscillations to the side wall of the piston located inside the cylinder.

This embodiment of the proposed method allows one to determine along with the possibility of identifying the position of the piston in the engine cylinder also the serviceability of the packing rings of the piston and the surfaces of the piston and the cylinder which these rings contact.

Yet another embodiment of the method according to the present invention features applying the artificial ultrasonic oscillations to the rolling bearing having the shaft of the fuel pump arranged thereinside.

This embodiment of the proposed method allows one to determine the serviceability of the elements of the rolling bearing and of the shaft mounted thereinside.

With these and other objects in view, there is also provided an apparatus for practicing the above-mentioned method of monitoring the performance of internal combustion engine mechanisms, comprising a receiving electromechanical converter adapted to be mounted on the body of the mechanism being monitored and which generates electrical oscillations containing an intelligence signal characterizing the motion of the chosen moving element of the mechanism being monitored, the output of said receiving electromechanical converter being connected to the input of an electrical filter which serves for the isolation from the spectrum of the electrical oscillations generated by the receiving electromechanical converter of an area occupied by the intelligence signal and which has its output connected to the input of a meter for measuring the amplitude and time parameters of the intelligence signal, which, according to the invention, further comprises a generator for generating continuous electrical oscillations of an ultrasonic range, having its output connected to a transmitting electromechanical converter adapted to be mounted on the body of the mechanism being monitored and capable to generate ultrasonic mechanical oscillations propagating toward the chosen moving element of the mechanism being monitored, while the electrical filter is made in the form of a band-pass filter of the generator's carrier frequency with a transmission band corresponding to the width of the area of the spectrum of the intelligence signal and has its output connected to the input of the meter via a detector serving for the isolation of the intelligence signal and a low-frequency amplifier connected in series, the receiving electromechanical converter being designed so as to receive the ultrasonic mechanical oscillations modulated as a consequence of the motion produced by the chosen moving element.

The above-disclosed apparatus permits one to realize completely the possibilities of the proposed method of monitoring the performance of internal combustion engine mechanisms. The construction of the apparatus ensures its increased selectivity and noise immunity and provides thereby its accuracy in the determination of the motion character of the chosen moving element of the mechanism monitored on the basis of which there are defined the performance characteristics of this mechanism. To a certain extent this results from the provision in the above apparatus of the ultrasonic frequency electrical generator by means of which the intensity of the ulrasonic oscillations applied to the chosen moving element may be varied over a fairly wide range required for decreasing the action of interferences to a desired degree.

Another embodiment of the apparatus according to the present invention features the incorporation of a transducer for identifying the angular position of the engine crankshaft, the output of said transducer being connected to another input of the meter serving for time synchronization of the meter.

The incorporation into the proposed apparatus of the above-described transducer makes it possible due to ensuring a high degree of accuracy in the determination by this apparatus of the motion character of the chosen moving element to employ this embodiment of the apparatus for monitoring the time and angle parameters of fuel injection by the injector with the correlation of these parameters with the angular position of the crankshaft and to use this apparatus in the system of controlling the process of fuel injection in the diesel engine.

Still another embodiment of the apparatus according to the present invention features the integration of the receiving and transmitting electromechanical converters into a single receiving-transmitting electromechanical converter performing the functions of both of said converters, the output of the generator being connected to the receiving-transmitting electromechanical converter by a resistive element.

The integration of the receiving and transmitting electromechanical converters into a single receiving-transmitting converter allows one to simplify the construction of the proposed apparatus, which is particularly essential in monitoring the performance of small-size engines as well as while doing the monitoring in field conditions.

Still another embodiment of the apparatus according to the present invention features that the detector is designed as an amplitude detector and intended for the isolation of the modulating envelope of the electrical oscillations received.

It is expedient to use a simple amplitude detector in the case when the construction of the engine and of the mechanism monitored allows one to install the receiving and transmitting converters on the body of this mechanism so that the amplitude modulation is predominant in the modulation of the ultrasonic mechanical oscillations.

Still another embodiment of the apparatus according to the present invention features that the detector is designed as a phase detector and intended for the isolation of an intelligence signal representing the changes in the difference of the generator's signal phases, the output of the generator being connected to another input of the detector.

The phase detector is used in the case when the construction of the engine and of the mechanism monitored allows one to install the receiving and transmitting electromechanical converters on the body of this mechanism so that the receiving converter receives only the ultrasonic oscillations reflected from the chosen moving element when there takes place predominantly the phase modulation of these oscillations.

Still another embodiment of the apparatus according to the present invention features the output of the generator which is connected to another input of the detector by a phase-shifter.

The incorporation of a phase-shifter into the proposed apparatus allows one to optimize the operation of the phase detector and to discard the complex reconstruction of this detector each time when it becomes necessary to monitor the performance of the mechanism monitored of a new type.

Still another embodiment of the proposed apparatus according to the present invention features the output of the low-frequency amplifier which is connected to the input of the meter via a low-frequency band-pass filter for the isolation from the spectrum of the intelligence signal of a separate area of this spectrum.

The incorporation of a low-frequency filter into the above circuit of the proposed apparatus allows one, in the case when the artificial ultrasonic oscillations are modulated as a consequence of the simultaneous motion of the two different moving elements of the mechanism monitored, to isolate from the intelligence signal modulation spectrum such frequencies which characterize the motion of one of these elements as well as to supress the frequencies characterizing the motion of the other element.

The meter of the proposed apparatus according to the present invention may be designed as a means for measuring the level of the intelligence signal.

The above construction of the meter simplifying the apparatus is expedient in those cases when the oscillating motion of the chosen moving element of the mechanism monitored has a clearly expressed frequency.

The meter may be also designed as an oscillographic device for indicating the shape and measuring the length and phase of the intelligence signal.

The application of such an oscillographic device in the capacity of the meter is expedient in those cases when it is necessary to carry out a comprehensive and accurate analysis of all the peculiarities of the motion of the chosen moving element of the mechanism monitored, for example, when it is required to obtain a complete representation of the motion process of the injector needle in the course of the operation of the engine.

Furthermore, the meter may be designed as a stroboscope intended for determining the beginning time of the intelligence signal in relation to the time of the arrival of the piston at the preassigned position.

The application of such a stroboscope in the capacity of the meter is expedient primarily in the simplified modification of the proposed apparatus intended for monitoring the performance of engine mechanisms in field conditions.

In the proposed apparatus according to the present invention the output of the meter may be connected to the input of a fuel feed regulator ensuring the control of the injection of fuel by the injector.

The above connection permits to perform automatic controlling of the injection of fuel.

BRIEF DESCRIPTION OF THE DRAWINGS

The present invention will be more clearly understood and the foregoing and other objects as well as the salient features thereof will become more evident from the succeeding consideration of the following detailed description of its particular embodiments given by way of example with descriptive reference being made to the accompanying drawings, in which:

FIG. 2 illustrates the time diagrams of the operational processes proceeding in the course of monitoring the performance of the injector of FIG. 1 carried out with the use of the method of the present invention;

FIG. 3 illustrates the spectrum diagram of the ultrasonic oscillations passing through the body of an engine mechanism with an internal moving element during the monitoring of this mechanism carried out with the use of the method according to the present invention;

FIG. 4 illustrates the time diagrams of the oscillating motions performed by the needle of the injector during the injection of fuel, these diagrams being obtained in monitoring the performance of the injector upon starting up carried out with the use of one of the embodiments of the method according to the invention;

FIG. 5 illustrates the cylinder with a piston of the engine carrying the instrumentation for monitoring the performance thereof accomplished with the use of another embodiment of the method according to the invention;

FIG. 6 illustrates the time diagrams of the processes proceeding in the course of monitoring the performance of the cylinder with a piston shown in FIG. 5;

FIG. 7 illustrates the time diagram of the intelligence signal obtained in monitoring the performance of the piston rings carried out with the use of still another embodiment of the method according to the present invention;

FIG. 8 illustrates the fuel pump of a diesel engine carrying the instrumentation for monitoring the performance of the bearing and the shaft of this pump mounted thereinside carried out with the use of still another embodiment of the method according to the present invention;

FIG. 9 illustrates the time diagram of the intelligence signal obtained in the course of monitoring the performance of the bearing and the shaft of the fuel pump mounted thereinside shown in FIG. 8;

FIG. 10 illustrates the block-diagram of an apparatus for monitoring the performance of internal combustion engine mechanisms according to the present invention;

FIG. 11 illustrates the block-diagram of one embodiment of the proposed apparatus comprising a transducer for determining the top dead center of the piston according to the present invention;

FIG. 12 illustrates the block-diagram of another embodiment of the proposed apparatus comprising a unified receiving-transmitting electromechanical converter according to the present invention;

FIG. 15 illustrates the block-diagram of still another embodiment of the proposed apparatus provided with a meter for measuring the level of an intelligence signal according to the present invention;

FIG. 16 illustrates the block-diagram of still another embodiment of the proposed apparatus provided with an oscillographic device according to the present invention;

FIG. 17 illustrates the block-diagram of still another embodiment of the proposed apparatus provided with a stroboscope according to the present invention.

DETAILED DESCRIPTION OF THE INVENTION

Figure 1:
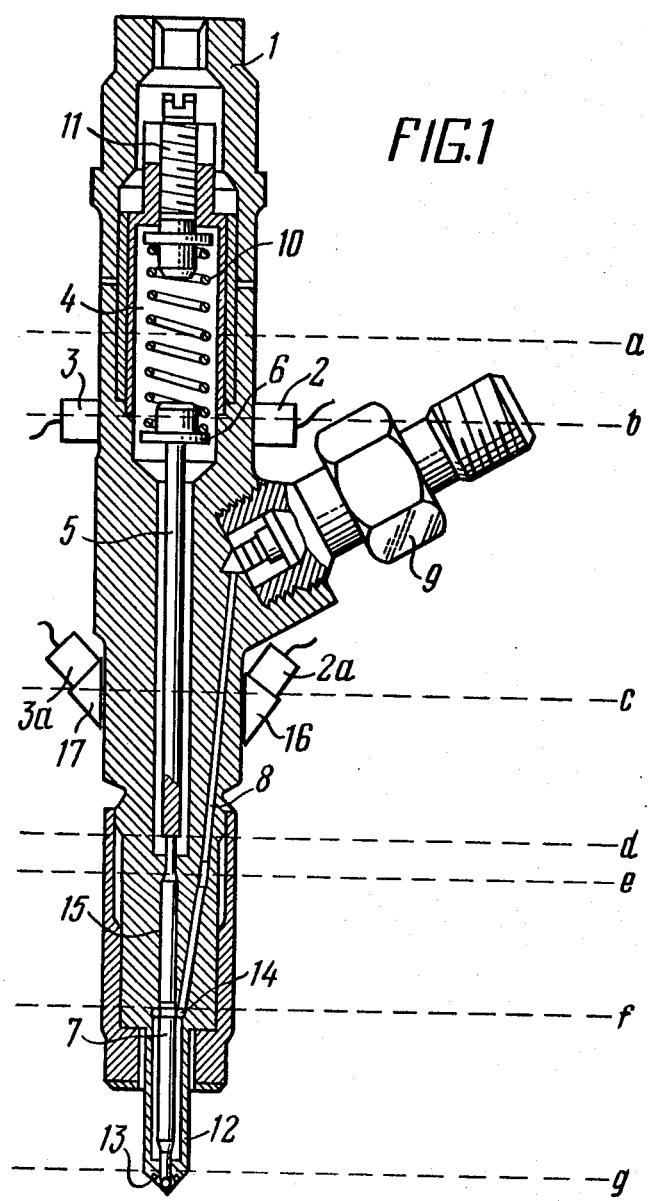
FIG. 1 illustrates in simplified form the injector of a diesel engine whose operation is monitored, this example being given in order to illustrate the method of monitoring the performance of internal combustion engine mechanisms according to the present invention.

The proposed method of monitoring the performance of internal combustion engine mechanisms according to the present invention may be utilized for carrying out with this or that purpose the testing of a diesel engine. In a general case, monitoring may be exercised over any mechanism of the engine comprising moving elements or kinematic pairs, for example, a cylinder-piston group, the injector of a fuel system, a fuel pump and so forth. In the capacity of the mechanism monitored of a diesel engine it is most convenient and illustrative to use the injector of a fuel system of this engine, this example being taken for describing the essence of the proposed method. Such an injector relating to needle injectors and provided with several spraying holes is shown in FIG. 1.

Prior to the initial stage of carrying out the testing of the engine on the body 1 of the injector there are arranged a means 2 capable of generating mechanical oscillations with a frequency of the ultrasonic range, and an electromechanical means 3 capable of receiving and converting these oscillations into a corresponding electrical signal. The means 2 and the means 3 are arranged, for example, at the level "b" shown in the drawing as extending across the area of the internal cavity 4 of the injector, wherein the upper end portion of a rod 5 having an annular stop projection 6 may perform its motion. Subsequent to starting up the engine, the means 2 and the means 3 are brought into action, as a result of which to the annular stop projection 6 of the rod 5 are applied the ultrasonic mechanical oscillations generated by the means 2.

During the operation of the engine the needle 7 of the injector and the rod 5 rigidly connected thereto are performing reciprocating motion under the action of periodic changes in the pressure of fuel supplied into the injector along a passage 8 by a coupling 9.

Together with the needle 7 and the rod 5, a compression spring 10 connected thereto moves in a compressing and decompressing manner. The spring 10 is arranged in the cavity 4 between the annular stop projection 6 of the rod 5 and a screw 11 which is intended for adjusting the degree of initial compression of this spring. The needle 7 moves from its lower (according to the drawing) position at which the point of the needle 7 is located entirely inside a sprayer 12 and its lateral holes 13 are completely closed, up to its top (according to the drawing) position at which the point of the needle 7 has left the sprayer 12 under the action of fuel pressure in the passage 8 and its lateral holes 13 are opened completely ensuring thereby the injection of fuel into the engine cylinder (not shown in the drawing). As a result of the motions produced by the needle 7 together with the rod 5 the conditions of the propagation of ultrasonic mechanical oscillations undergo changes in the direction from the means 2 generating these oscillations toward the means 3 receiving the ultrasonic mechanical oscillations passing through the walls of the body 1 and the upper portion of the rod 5. The matter is that the ultrasonic mechanical oscillations are known to propagate in a homogenous medium in a linear manner and with constant attenuation, and the width of a diagram of the directivity of these oscillations is determined by the ratio of the area (or diameter) of the radiator to their wave length in the medium considered, and the greater is the above ratio, the narrower is the directivity diagram. However, when the ultrasonic oscillations pass through the line of demarcation of two media which in this case is, for example, the boundary between the wall of the body 1 of the injector and the fuel film, or between the fuel film and the surface of the rod 5 or of the needel 7, there takes place a disturbance to a greater or lesser degree in the oscillations propagation linearity and a channge in their level and phase depending on the thickness of the bordering substances. More specifically, upon reciprocation of the annular projection 6, which this projection performs crossing the propagation path of the ultrasonic mechanical oscillations, there will periodically occur changes in the time of reflection degrees, attenuation and refraction of the propagating mechanical oscillations. These changes give rise to the phase-amplitude modulation of the propagating ultrasonic mechanical oscillations, the modulation occuring strictly by the law of changes in the above conditions of their propagation.

In the method according to the present invention it is the modulated mechanical oscillations of the ultrasonic range coming from the chosen moving element, i.e. in this case from the rod 5 of the injector, and arising as a result of the interaction of the moving element and the artificial mechanical oscillations applied thereto at the time of its motion, that are received and converted into an electrical signal by means of the electromechanical means 3.

Subsequent to the reception and conversion of the modulated ultrasonic oscillations into an electrical signal with the help of any suitable means there is accomplished the isolation of the band of frequencies of the electrical signal with a central carrier frequency equal to the frequency of the applied ultrasonic oscillations. This isolation is required in order to remove from the entire spectrum of the electrical signal its low-frequency components which result from the vibration of the elements of the injector and the elements of the other mechanisms of the engine caused during the operation of the engine and considered as an interference. The frequency band isolated is equal to: $A = F_c \pm F_m$, where $F_c$ is the central carrier frequency and $F_m$ is the expected maximum frequency of the modulation. The operation of isolating the modulated carrier frequency, the value of which may lie in the range from one to tens megahertz, from the entire spectrum of the electrical signal with filtering of its low-frequency area, which results from vibration and lies in the frequency region amounting approximately to tens kilohertz, increases the signal-noise ratio and improves the noise immunity of the receiving path.

Subsequent to this operation, there is performed the detection of the isolated carrier frequency of the electrical signal for obtaining its low-frequency modulating component which represents an intelligence signal and carries all the information about the character of the motion of the rod 5 in the zone of the artificial ultrasonic oscillations applied thereto.

After the detection the intelligence signal obtained is subjected to appropriate processing by means of measuring its spectral and time parameters and determining thereby the spectral-time parameters of the ultrasonic mechanical oscillations received from the upper portion of the rod 5 of the injector. The analysis of the intelligence signal parameters obtained allows one to determine the major parameters of fuel injection and to assess the performance of the injector.

Thus, hereinabove has been described one embodiment of the method according to the present invention comprising the steps of receiving and converting into an electrical signal the modulated ultrasonic mechanical oscillations passed through the mechanism monitored, that is, through the injector with the moving element located thereinside, in the capacity of which is chosen the rod 5 with the annular projection 6. In this embodiment there takes place mainly the amplitude modulation of the artificial ultrasonic mechanical oscillations applied to the rod 5, which results from the shadow effect.

The proposed method of monitoring the performance of the mechanisms of the engine may be illustrated by the time diagrams which shown given in FIG. 2 and the spectrum diagram of the electrical signal obtained shown in FIG. 3. In FIG. 2 in all of the time diagrams on the abscissa are plotted the time t and also the value of the angle $\rho$ of the rotation of the crankshaft of the engine, which is done for the convenience of describing certain aspects of the invention that will be discussed hereinbelow, and on the ordinate in arbitrary units are plotted, respectively: in the time diagram 2a—the electrical voltage $U_A$, in the time diagram 2b—the pressure P of the fuel supplied into the injector, and in the time diagrams 2c, 2d and 2e—the electrical voltages $U_M$, $U_D$, and $U_P$. In the diagram shown in FIG. 3 on the abscissa is plotted the frequency F of the received ultrasonic oscillations, and on the ordinate is plotted the intensity $U_T$ of the electrical signal obtained. In the time diagram 2a shown is the shape of the continuous mechanical oscillations which are applied to the chosen moving element of the mechanism monitored. The time diagram 2b shows the curve of changes in the pressure of the fuel supplied into the injector. In the time diagram 2c shown are the ultrasonic oscillations converted into an electrical signal, which are received from the upper portion of the rod 5 and modulated as a result of the motion of the rod 5. In the time diagram 2d shown is the shape of the intelligence signal which was obtained after the detection of the electrical signal shown in the diagram 2c and which illustrates in detail the process of the motion of the rod 5 and, respectively, of the needle 7 connected thereto. In the time diagram 2e shown are the indications of the engine position at the top dead center. These indications will be utilized in the following sections of the description of the present invention.

As may be seen from the time diagrams shown in FIG. 2, after the pressure of the fuel supplied into the injector (FIG. 2b) has started to increase, the envelope level of the received ultrasonic oscillations (FIG. 2c) also begins to increase due to the initial motion of the needle 7 and the rod 5 connected thereto. The rate of an increase in the modulating envelope, or, in other words, the length of the edge of the pulse A (FIG. 2d) of the intelligence signal corresponds exactly to the rate of the motion of the needle 7 with the rod 5 from its position in which the sprayer 12 is closed to the position in which the sprayer 12 is completely opened. When the sprayer 12 is opened, the system consisting of the interconnected needle 7, the rod 5 and the spring 10 may perform low-frequency oscillations with a small amplitude resulting from different reasons. To these oscillations correspond small oscillations existing at the apex of the pulse A of the intelligence signal. When the sprayer 12 is closed, the needle 7 may, however, open it up in certain cases for a short interval, as a result of which additional parasitic injections may occur, or, in other words, secondary injections of small amounts of fuel. The occurrence of secondary fuel injections results from the transient processes taking place in the fuel system of the engine. In the time diagram if FIG. 2d to the secondary injections of fuel correspond the pulses B and C.

In the proposed method on the basis of the intelligence signal, whose curve, as may be seen from FIG. 2, has a clearly defined shape, there are determined the time parameters of fuel injection by the injector, namely, the moment $t_1$ of the beginning and the moment $t_2$ of the termination of fuel injection, the duration $\tau_o$ of the useful injection repetition period, the duration $\tau_u$ of the useful injection, the time intervals D of fuel feed absence, the moments $t_3$ and $t_5$ of the occurrence of secondary fuel injections and the moments $t_4$ and $t_5$ of their termination, the durations $\tau_{p1}$ and $\tau_{p2}$ of secondary injections, and also the duration $\tau_a$ of the time interval between the moment $t_1$ of the beginning of the useful injection and the moment $t_3$ of the beginning of the first secondary injection, and the duration $\tau_b$ of the time interval between the moment $t_1$ and the moment $t_5$ of the beginning of the second secondary injection. From the length of the leading and trailing edges of the pulse A determined is the rate of the motion of the needle 7, respectively, at opening and closing of the sprayer 12 of the injector. Furthermore, in the case of using the indications E (FIG. 2e) of the top dead centre of the piston determined is the duration $\tau_c$ or the angle $\rho_c$ of useful injection advance, which will be discussed in more detail hereinbelow.

The other performance characteristics of the injector being monitored may be determined from the amplitude parameters of the intelligence signal. Thus, measuring the amplitude of the pulse A (FIG. 2d) of the useful injection allows one to determine the length of the working stroke of the needle 7 at the time of opening and closing of the sprayer 12, which is an important performance parameter of the injector, whose value varies for different types of injectors. From the amplitude of the small peak X of a negative polarity existing at the initial portion of the apex of the pulse A determined is the length of the rebound (or harmful back stroke) of the needle 7 after it has made a forward working stroke. This parameter affects the law of fuel feed into the combustion chamber of the engine cylinder. Finally, from the amplitude (and with due allowance made for the length) of the pulses B and C corresponding to the secondary injections of fuel, determined is the volume of the fuel uselessly supplied at the time of these secondary injections into the cylinder, and, thereby, the amount of fuel overconsumption by the injector.

The clearness of the shape of the isolated intelligence signal and, thus, the reliability of the assessment of the performance parameters of the injector made on the basis thereof are determined from the ratio of the useful and interfering signals (that is, from the signal-noise ratio) in the paths of receiving and processing of the intelligence signal. The higher is the signal-noise ratio, the higher is then the accuracy of processing of the intelligence signal, and, consequently, the higher is the reliability of the assessment carried out. As applied to the proposed method, the values of the signal-noise ratio will depend on the level of vibration interferences, the level of the useful modulated signal and the level of the modulation of the applied ultrasonic oscillations.

Upon referring now to FIG. 3 showing the spectrum of the electric signal obtained, there may be seen that the oscillations received by the means 3 represent the total of the useful signal occupying the area F of the spectrum and of the interference signal occupying the area G. The useful signal is represented by the ultrasonic oscillations with a central carrier frequency $F_c$ modulated as a consequence of the motion performed by the moving element of the mechanism being monitored and having a modulation spectrum in the frequency interval from $F_c = F_m$ up to $F_c + F_m$, where $F_c$ has a value of about hundreds and thousands kilohertz. The interference signal is represented by the low-frequency oscillations which result from the vibration of the body of the mechanism being monitored and whose active range lies, for example, for the injectors of the engine within the boundaries from 0 to 25 kilohertz. From the above-stated and from the diagram of FIG. 3 it follows that the area G of the interference and the area F of the useful signal are widely separated in frequency and for this reason the interference does not affect substantially the signal-noise ratio.

On the other hand, the level of the useful signal will depend on the character of the mutual arrangement of the source of the applied ultrasonic oscillations and of the receiver of the oscillations passed through the chosen moving element, and the modulation level will depend on the degree of variations in the conditions of the propagation of the applied ultrasonic oscillations during the motion of the moving element of the injector. It is perfectly evident that the useful signal will be at its highest level when the above-mentioned source and the receiver, that is, the means 2 (FIG. 1) and the means 3, are arranged on the diametrically opposite sides of the injector and on the line extending perpendicular to the longitudinal axis of the injector, while the greatest variation in the conditions of the propagation of the applied ultrasonic oscillations and, consequently, the highest modulation level will take place in the case when these oscillations are applied to that portion of the chosen moving element which has a complex geometrical configuration.

In FIG. 1 by the letters a, b, c, d, e, f and g designated are the lines of the possible levels of the arrangement on the body 1 of the means 2 generating ultrasonic mechanical oscillations, and of the means 3 receiving the above oscillations. In a general case, any chosen moving element of the injector may be subjected to the application of the ultrasonic mechanical oscillations along any of these lines. From the examination of the portions of the moving elements of the injector, across which the level lines are drawn, it may be seen that almost all of them exhibit a complex configuration, with the exception of the middle portion of the rod 5, across which the line "c" is drawn and which should be considered as having a simple configuration and, therefore, not ensuring a sufficiently high level of modulation. However, despite that the point of the needle 7 and its middle portion with an annular groove 14, across which are drawn, respectively, the lines "g" and "f", exhibit a sufficiently complex configuration, the application of the ultrasonic oscillations to these portions of the needle 7 involves difficulties because of the impossibility of arranging the means 2 and the means 3 at these levels on the injectors of many types existing at the present time. This impossibility results from the fact that the lower (according to the drawing) end of the injector is arranged, as a rule, deeply inside the body 1 of the injector. In some cases the application of ultrasonic mechanical oscillations to the interconnected upper end portion of the needle 7 and the lower end portion of the rod 5, across which are drawn respectively the lines "e" and "d", also involves some difficulties. The middle portion of the body 1, within the boundaries of which is arranged the upper end portion of the rod 5 with its annular projection 6, is located, as a rule, outside the body of the engine and access to this portion of the body 1 usually is not embarrassed. Consequently, in this embodiment of the proposed method according to the present invention this is to the upper end portion of the rod 5 located on the line "b" that the ultrasonic mechanical oscillations are applied, which together with the needle 7 makes up a single composite element opening and closing the sprayer 12 of the injector. The increased modulation level of the ultrasonic mechanical oscillations which are applied to the upper end portion of the rod 5 results not only from the complexity of the configuration of this portion, but also from the fact that at the location site of its annular projection 6 there takes place a marked change in the wave resistance of the medium through which these oscillations are propagating. This wave resistance $\rho$ is determined as $\rho = p \cdot c$, where "p" is the density of the medium and "c" is the speed of sound in it. Such a change in the wave resistance is caused by the rod 5 being connected to the body 1 and to the spring 10 of the injector via the layers of fuel, whose thickness varies periodically during the motion performed by the needle 7 and the rod 5. As a result of all this, the application of the ultrasonic mechanical oscillations to the upper end portion of the rod 5 (the level of the line "b") ensures a high signal-noise ratio upon receiving and processing of the intelligence signal.

However, in the diagnosis of the fuel system of the engine there may arise such a situation when in the process of monitoring the performance of the injector or some other mechanism it proves necessary to trace the motion performed by the element arranged in that portion of the mechanism which is located deeply inside the body of the engine and upon which due to this reason it is impossible to mount the means 2 and the means 3. For example, at the time of monitoring the performance of the above-described injector it may be required to determine the parameters of injection on the basis of the direct application of the ultrasonic mechanical oscillations to the needle 7, whose motion allows the measurement of some of these parameters in the most accurate way possible. The increased accuracy of such measurements is a result, in this case, of the surface of the needle 7, from the viewpoint of its construction has a fairly good fit to the walls of the through hole 15 in the body 1 and, consequently, the needle 7 cannot to move in other directions than in the longitudinal ones, while the rod 5 and the spring 10 may perform freely in the cavity 4 not only working longitudinal motions, but also oscillating motions in other directions, for example, transverse ones, which is caused by the vibration of the other mechanisms of the operating engine. This is why upon the application of the ultrasonic mechanical oscillations to the needle 7 a considerably lesser amount of interferences are superposed on the intelligence signal, and the accuracy of processing this signal is increasing in this case markedly. The increased accuracy of the information about the character of the motion performed by the needle 7 itself makes it possible to enhance, for example, the accuracy of the assessment of the quality of fuel spraying by the injector, which will be discussed in more detail hereinbelow.

In the case of the occurrence of the situation just described hereinabove or one similar to it, the proposed method contemplates, according to still another embodiment, the steps of receiving and converting the modulated ultrasonic mechanical oscillations reflected from the chosen moving element of the engine mechanism being monitored. As applied to the injector of the fuel system of the engine, the application of the ultrasonic mechanical oscillations is accomplished in this case with the help of the means 2a (FIG. 1) generating these oscillations and arranged not directly on the body 1, but on a means 16 secured to the body 1 and adapted to change the direction of the propagation of the oscillations. The receiving means 3a is also arranged on an identical means 17 secured to the body 1 and adapted to receive the ultrasonic mechanical oscillations supplied only from a definite direction. The means 2a and the means 3a are arranged on that portion of the body 1 which is located above the body of the engine, for example, along the line "c". In this specific case, the means 16 is chosen such that the ultrasonic mechanical oscillations generated by the means 2a would propagate across the body 1 in the form of a bundle in the direction toward the upper end of the needle 7. The means 17 is chosen respectively such that the means 3a arranged thereon would receive only the ultrasonic mechanical oscillations reflected from the upper end of the needle 7. The ultrasonic mechanical oscillations received by the means 3a in this case, just as in the cases described hereinabove, will be also modulated, but, however, the modulation of these oscillations will be primarily of the phase type. The phase modulation of the ultrasonic mechanical oscillations results from a periodic change during the motion of the needle 7 in the distance between the upper end of the needle 7 and the receiving means 3a. The succeeding operations of this embodiment of the proposed method do not differ substantially from those described hereinabove, excluding the operation of detection, which for the case considered should be phase detection. The time and spectral diagrams illustrating this embodiment will look similarly to those shown in FIGS. 2 and 3.

Still another embodiment of the proposed method contemplates that in the process of monitoring the performance of the mechanisms of the engine there are accomplished the steps of receiving and converting the ultrasonic mechanical oscillations applied to some chosen moving element and modulated as a consequence of a change in the mechanical impedance of the mechanism being monitored with the above element located thereinside. This embodiment is based on the fact that any mechanical device or, in the simplest case, any member, to which mechanical oscillations are applied, has a certain spectrum of natural resonance frequencies determined by the shape and size of this member. A change, for any reason, for example, in the thickness of the member results in a respective change in the spectrum of its resonance frequencies, or, in other words, in a respective change in its mechanical impedance. If one considers some one specific frequency of this spectrum, then changes in the thickness will be expressed in a change in the amplitude of the chosen resonance frequency. The character and the quantity of a change in the amplitude carry at that the information about the character and the quantity of a change in the thickness of the member. The mechanisms of the engine whose performance are monitored by the proposed method possess dimensions that ensure in them a sharply expressed spectrum of natural resonance frequencies. The moving elements of the operating mechanism at the place of the application of the ultrasonic mechanical oscillations thereto change the path as well as the speed of the passage of these oscillations and, thereby, its conventional thickness. This, as was stated hereinabove, leads to a change in the mechanical impedance of the mechanism being monitored at the place of the application of the ultrasonic mechanical oscillations thereto and, consequently, to a change in the amplitude of these oscillations, if their frequency is close to the chosen resonance frequency of this mechanism. When a signal is available about the beginning of some process with which are correlated the processes proceeding in the mechanism being monitored of the operating engine, then it becomes also possible to determine the phase of the occurring changes in the mechanical impedance.

The succeeding operations of the above-described embodiment of the proposed method do not differ substantially from the operations accomplished in the primary embodiment of the method. However, it should be noted here that in this embodiment employing the resonance properties of the mechanism being monitored there is a possibility for discarding a separate means for generating ultrasonic mechanical oscillations and a separate means for their reception arranged on the different sides of the mechanism being monitored. In this embodiment use may be made of only one electromechanical means combining in itself the functions of both the above-mentioned means. But this aspect of the present invention will be discussed in detail hereinbelow.

The proposed method permits one to carry out the assessment of the quality of fuel spraying by the injector of the engine. This assessment is carried out, as was stated hereinabove, on the basis of the information obtained about the oscillating motion performed by the needle 7 (FIG. 1) of the injector, which this moving element opening and closing the sprayer 12 is effecting during the injection of fuel. The needle 7 is subjected, according to the invention, to the application of the ultrasonic mechanical oscillations upon starting up the engine.

During the operation of the engine in the starting-up conditions, when the injector does the injection of fuel into the cylinder with a frequency of about 40 to 80 injections per minute and when the rate of a fuel pressure increase in the passage 8 is comparably small and amounts to less than 20 kgf/cm$^2$ for 5 to 15 seconds, the needle 7 of the injector, as is known, is performing periodic oscillations during each time interval. The needle 7 is performing these oscillations in relation to its certain position in the through hole 15, which represents an intermediate position between its position in which the sprayer 12 is completely opened (top in the drawing) and its position in which the sprayer 12 is completely closed (bottom in the drawing). As is known, a primary effect on the quality of fuel spraying have the factors related to the mobility of the needle 7. The constructive and manufacturing parameters of the injector (such as the dimensions of the holes 13 of the sprayer 12, the hydraulic characteristics of the sprayer 12, the opening pressure of the injector, the rigidity of the spring 10 and the like) as a matter of face have no substantial effect on the quality of fuel spraying, if they are in the range of their permissible deviations. This is why the quality of fuel spraying may be assessed with a high degree of reliability by the frequency and the amplitude of the oscillations of the needle 7 characterizing the mobility displayed by the needle 7. Thus, for example, for a diesel engine of the D-50 type, the frequency of the fundamental harmonic of the oscillations of the needle 7 displaying good mobility amounts to about 1000 hertz. In the case when the needle 7 has poor mobility and the injector, as a result of this, does not ensure the adequate quality of fuel spraying, the frequency of the oscillations of the needle 7 is much lower than that mentioned hereinabove or the needle 7 does not perform any oscillations at all during the injection.

In the time diagrams shown in FIG. 4 and obtained during the testing of the injector with the use of this embodiment of the proposed method given are the examples of two curves representing the oscillations of the needle 7 performed by it during the injection of fuel by the injector. FIG. 4a at that shows the curve representing the oscillations of the needle 7 which displays good mobility and, consequently, ensures the adequate quality of fuel spraying, while FIG. 4b shows the curve representing the oscillations of the needle 7 which displays unsatisfactory mobility and does not ensure the adequate quality of fuel spraying.

Thus, owing to the fact that the proposed method provides the possibility of obtaining practically the comprehensive information about the character of the motion performed by the elements of the injector, by means of which is done the opening and closing of its sprayer 12 (FIG. 1), this method allows one to carry out the assessment of the quality of fuel spraying with a high degree of reliability and accuracy. Using the proposed method, this assessment may be carried out both during the testing of the performance of the engine its and during the testing of the performance of the injector on a special test bed. In the latter case owing to the possibility of obtaining the comprehensive information about the motion performed by the needle 7, the feed of fuel into the passage 8 of the injector may be accomplished with the use of a suitable means actuated both manually and mechanically, this being also done both in continuous and interrupted conditions. It should be noted here that during the assessment of the quality of fuel spraying, the motion of the needle 7 may be traced while receiving the modulated ultrasonic oscillations both passed through the body 1 and the needle 7 of the injector, if the actual physical conditions permit this, and reflected from the needle 7 as well. Furthermore, this tracing may be done while receiving the ultrasonic oscillations modulated as a consequence of a change during the motion performed by the needle 7 in the mechanical impedance of the injector. The remaining operations of the above-described embodiment of the proposed method do not differ substantially from the operations of the primary embodiment of the method.

The proposed method also enables one to carry out the assessment of the elasticity, integrity and the degree of preliminary compression of the spring 10 (FIG. 1) of the injector. The degree of preliminary compression of the spring 10 is an important performance characteristic of the injector related to the assigned law of a change in the pressure of fuel supplied to the injector. The assessment of the foregoing characteristics is carried out on the basis of the information obtained about the oscillating motion performed by the spring 10, which is caused by the motion performed by the needle 7 and which is done after the termination of a working stroke of the needle 7. In order to determine the character of such natural oscillations of the spring 10 the ultrasonic oscillations are applied thereto at the level designated by the line "a". The natural oscillations performed by the spring 10 are traced, as a rule, while receiving and converting into an electrical signal the modulated ultrasonic mechanical oscillations passing through the body 1 and the spring 10 of the injector. However, in some cases this tracing may be done while receiving the reflected modulated oscillations, or the oscillations modulated as a consequence of changes in the mechanical impedance of the injector occurring at the time of the natural oscillations of the spring 10. The remaining operations related to the processing of the obtained electrical signal are substantially identical with the operations of the primary embodiment of the proposed method. The assessment of the integrity of the spring 10, its elasticity and fatigue changes in elasticity, as well as the degree of preliminary compression of this spring during the intervals when the injection of fuel is not effected, is carried out on the basis of the values of the frequency and the degree of attenuation of the natural oscillations of the spring 10, which are determined in the processing of the isolated intelligence signal.

Still another mechanism of the internal combustion engine whose performance may be monitored by the proposed method is its cylinder-piston group. During the monitoring of the performance of this mechanism by the proposed method there may be determined the position of the piston 18 (FIG. 5) in the cylinder 19, and also the serviceable condition of the piston rings 20. In order to trace the motion performed by the piston 18 in the cylinder 19, according to the invention, the ultrasonic mechanical oscillations are applied to the bottom 21 of this piston. The application of the ultrasonic mechanical oscillations is accomplished with the help of the means 2b arranged on the head of the cylinder 19. A bundle of the ultrasonic mechanical oscillations from the means 2b passes through the head of the cylinder 19 and its gas cavity 22 and being reflected from the bottom 21 arrives at the receiving means 3b. During the translational motion performed by the piston 18 from its bottom dead center to the top dead center here, just as in the above-described cases, the conditions of the propagation of the ultrasonic oscillations will vary with time, such as, for example, the conditions of the reflection of these oscillations and the length of the path covered by them. As a result of this, the ultrasonic oscillations received by the means 3b will undergo modulation which will be of the phase-frequency type, the depth of this modulation depending on the rate of the motion performed by the piston 18 and the frequency of the ultrasonic mechanical oscillations applied thereto. At the top dead center of the piston 18 changes in the frequency or in the phase of the ultrasonic oscillations received will be equal to zero. This is why by measuring during one cycle of the motion performed by the piston 18 the difference of the phases of the oscillations applied to the piston bottom 21 and of the oscillations received by the means 3b there may be unambiguously determined the position of the top dead center, the arrival of the piston 18 at its top dead center corresponding to the maximum period of a change in this difference.

It should be noted that the position of the top dead center may be determined not only by means of applying the ultrasonic mechanical oscillations to the bottom 21 of the piston 18, but also by means of applying these oscillations along the side wall of the cylinder 19 to the top (according to the drawing) piston ring 20. The reflected oscillations received from this ring will undergo modulation of the phase-frequency type.

The process of monitoring the motion performed by the piston 18 in the cylinder 19 is illustrated by the time diagrams shown in FIG. 6. In all of these diagrams on the abscissa are plotted, just as in the time diagrams of FIG. 2, the time t and the values of the angle ρ of rotation of the crankshaft of the engine, while on the ordinate are plotted the electrical voltages $U_A$, $U_M$ and $U_D$. In the diagram 6a shown are the continuous ultrasonic mechanical oscillations which are applied to the bottom 21 of the piston 18, in the diagram 6b shown are the frequency-modulated ultrasonic oscillations being received and in the diagram 6c shown is the curve of a change in the phase difference of the ultrasonic mechanical oscillations being applied and received. As may be seen from the diagram of FIG. 6c, the position of the top dead centre designated in this diagram by the letters UDP may be determined by finding out the centre of symmetry of the shown curve of a change in the phase difference.

In order to determine the serviceability of the piston rings 20 (FIG. 5), the ultrasonic mechanical oscillations, according to the invention, are applied to the side peripheral wall of the piston 18. This application may be accomplished by arranging the means 2c generating ultrasonic mechanical oscillations and the receiving means 3c on the opposite sides of the cylinder 19 in a manner shown in the drawing. The ultrasonic mechanical oscillations received by the means 3c in this case will have primarily the amplitude modulation which results from the shadow effect, whose periodic occurrence is caused by crossing by the piston 18 moving in a reciprocating fashion of the propagation path of the ultrasonic mechanical oscillations applied thereto. In the process of monitoring the character of the motion performed by the piston 18 and its piston rings 20 in relation to the walls of the cylinder 19 is traced here, and from the observed peculiarities of this motion determined are the character of the fitting of the piston rings 20 to the internal surface of the side wall of the cylinder 19 and, thereby, the degree of the wearing of the piston 18 and its rings 20. It goes without saying that tracing of the motion of the piston 18 in the cylinder 19 may be done by using the shadow effect procedure, but also by using the reflection procedure and the impedance procedure which have already been described hereinabove. The remaining operations of this embodiment do not differ substantially from these operations of the primary embodiment of the method.

Shown in FIG. 7 is the time diagram of the intelligence signal obtained in tracing the motion performed by the piston 18 with three piston rings 20. In this diagram on the abscissa are plotted the time t and the value of the angle ρ of rotation of the crankshaft of the engine, while on the ordinate is plotted the electrical voltage $U_D$. The location of the pulses H on the time axis of this diagram corresponds to the moments of crossing by the piston rings 20 of the bundle of the ultrasonic mechanical oscillations applied thereto. The amplitude of these pulses characterizes the degree of the fitting of the piston rings 20 to the wall of the cylinder 19, the smaller is the amplitude, the worse is the fitting of these rings and the higher is the degree of their wearing. As may be seen from the diagram, the smallest amplitude is observed for the pulse $H_3$ and, consequently, the worst fitting has the piston ring 20 first from the bottom (according to the drawing). The time location of the pulses H in the diagram also characterizes the actual position of the piston 18 in the cylinder 19 at these moments of time, and also allows one to determine the time of the arrival of the piston 18 at its top dead center since these pulses are disposed in the diagram symmetrically in relation to the foregoing centre.

The proposed method may be also employed for diagnosing some rolling bearing of the fuel pump representing a structural part of the fuel system of the engine. In the process of rotation of the shaft 23 (FIG. 8) arranged inside a rolling bearing 24, whose outer ring 25 is secured inside the body 1 of a fuel pump 26 and whose inner ring 27 is fitted onto the shaft 23, there always takes place some wobbling of the shaft 23 and irregularities in the motion performed by the elements of this bearing, for example, its rolling bodies represented by balls 28. In order to determine the degree of wobbling of the shaft 23 as well as the degree of irregularity in the motion performed by the balls 28, the ultrasonic mechanical oscillations, according to this embodiment of the proposed method, are applied to the bearing 24 having the shaft 23 arranged thereinside. The application of the ultrasonic mechanical oscillations is implemented by the means 2d secured to the body 1 of the fuel pump 26 on one of its walls, while the oscillations passed through this body and the bearing 24 are received by the means 3d secured to the opposite wall of the body. During the rotation of the shaft 23, the conditions of the propagation of the ultrasonic mechanical oscillations being applied, for example, the conditions of their reflection and attention, will vary because of its wobbling and also as a consequence of the motion, rotation and vibration of the balls 28 and the other elements of the bearing 24. Changes in these conditions of the propagation of the ultrasonic mechanical oscillations cause in this case, just as in all of the above-described cases, these oscillations to be modulated. As a result of this, the shape of the intelligence signal received after the detection of the modulating envelope will characterize sufficiently accurately all of the peculiarities of the motions which resulted in the modulation of the ultrasonic mechanical oscillations being applied.

Shown in FIG. 9 is the time diagram of the intelligence signal obtained upon applying the ultrasonic mechanical oscillations to the rolling bearing 24 having the shaft 23 of the fuel pump 26 arranged thereinside. In this diagram on the abscissa is plotted the time t, while on the ordinate is plotted the electrical voltage $U_D$. In this case the low-frequency component of the intelligence signal shown in the drawing characterizes the degree and the peculiarities of the wobbling performed by the shaft 23 and the condition of the rolling paths of the bearing 24, while the high-frequency component of this signal characterizes the condition of the balls 28 of this bearing, the greater is the amplitude of these components, the greater is the wobbling experienced by the elements of the rolling bearing 24 and the shaft 23. Furthermore, the analysis of the high-frequency component allows one to make a conclusion about the extent of deviations from the required size and from the true sphericity of the balls 28.

The apparatus (FIG. 10) incorporating the proposed method of monitoring the performance of internal combustion engine mechanisms described hereinabove will be considered, just as the primary embodiment of this method, with resort to the example of utilizing the apparatus for monitoring the performance of the injector of the fuel system of a diesel engine. The injector 20, partially shown in FIG. 11 and more fully shown in FIG. 1 belongs to the type of injectors which are used in the fuel system of a four-cylinder diesel engine mounted on the "Belarus" tractor with a rated power of about 80 h.p.

The proposed apparatus for monitoring the performance of mechanisms comprises an ultrasonic-frequency generator 30 generating continuous sinusoidal or pulse meandering electrical oscillations with a frequency from 100 kilohertz and higher. The selection of a specific value of the frequency of the generator 30 is dictated mainly by the dimensions of a particular mechanism being monitored and of its moving elements, and the value of this frequency may amount for small-size mechanisms to about a few megahertz or even more. The generator 30 is assembled, just as the other devices, with the use of conventional standard elements available in modern electronics. The output 31 of the generator 30 is connected to the input of a transmitting electromechanical converter 32 which is arranged on the body 1 of the injector 29 so that a bundle of the continuous ultrasonic mechanical oscillations generated thereby would pass through the top (according to the drawing) portion of the rod 5 with the annular stop projection 6. On the opposite side of the body 1 arranged in one line with the transmitting electromechanical converter 32 is a receiving electromechanical converter 33 which is capable to receive the bundle of the ultrasonic mechanical oscillations arriving from the upper portion of the rod 5 and modulated as a consequence of the motion performed by the rod 5, and to produce corresponding electrical oscillations of an ultrasonic range including an intelligence signal characterizing the motion performed by the upper portion of the rod 5. The transmitting electomechanical converter 32 and the receiving electromechanical converter 33 represent conventional small-size converters of the piezoelectrical type exhibiting a sufficient degree of sensitivity and designed for operation at the ultrasonic frequencies used in the apparatus described. The diameter of these converters does not exceed 8 to 10 millimeters.

The output of the receiving electromechanical converter 33 is connected to the input of an electrical band-pass filter 34 which is designed for the isolation from the entire spectrum of the electrical oscillations generated by the receiving electromechanical converter 33 of an area of this spectrum occupied by the intelligence signal with a central carrier frequency equal to the frequency of the generator 30. The band-pass filter 34 represents a passive (or active) resonance transmitting filter tuned to the frequency of the generator 30. The apparatus further comprises a detector 35 having its input 36 connected to the output of the band-pass filter 34. The detector 35 represents in this case an amplitude detector and is designed for the isolation of the modulating envelope of the carrier frequency transmitted by the band-pass filter 34, that is, for the isolation of the intelligence signal. The output of the detector 35 is connected to a low-frequency amplifier 37 which represents an active element having a transmission band in the range from 10 to 20 000 herts, and which is designed for the amplification of the intelligence signal isolated in the detector 35. The above-specified range of the frequency transmission band is dictated by the fact that the modulation spectrum of the intelligence signal includes, as a rule, the frequencies of the sonic range, and the specific width of the spectrum of this signal is determined by the geometrical dimensions and the rate of the motion of the chosen moving element of the mechanism being monitored.

The apparatus being described comprises further a meter 38 of the amplitude and time parameters of the intelligence signal having its input 39 connected to the output of the low-frequency amplifier 37. The meter 38 does the measuring of the foregoing parameters and produces the measuring data in such form which is the most convenient for the solution of a specific goal posed in the process of monitoring the performance of the injector 29. The meter 38 may represent a device of the analogue, digital or other types corresponding to each secific case of the monitoring.

Another embodiment of the proposed apparatus shown in FIG. 11 comprises a transducer 40 of the angle position of the crankshaft of the engine. The transducer 40 represents an electromechanical or electrical device which generates an electrical signal representing the angle position of the crankshaft, namely, the position of the top dead centre of the piston of the engine. The output of the transducer 40 is connected to the input 41 of the meter 38. The incorporation of the transducer 40 into the proposed apparatus makes it possible to accomplish the time synchronization of the meter 38. In this case the output 42 of the meter 38 may be connected to an electromechanical fuel feed regulator 43 incorporated into the fuel system of the engine. The possible connection of the meter 38 to the regulator 43 is shown in the drawing by a dash line.

Still another embodiment of the proposed apparatus shown in FIG. 12 comprises a resistive member 44 and a single receiving-transmitting electromechanical converter 45 combining the transmitting electromechanical converter 32 and the receiving electromechanical converter 33 shown in FIG. 10 and FIG. 11 and performing simultaneously the functions of both the aforesaid converters. The receiving-transmitting electromechanical converter 45 (FIG. 12) represents a single electromechanical converter sensing a change in the mechanical impedance of the injector 29, which takes place during the motion performed by the rod 5. In this embodiment the output 31 of the generator 30 is connected to the receiving-transmitting electromechanical converter 45 by the aforesaid resistive member 44 which represents a conventional resistor having an ohmic resistance. At the same time the receiving-transmitting electromechanical converter 45 is connected, similarly as it was done in all of the other embodiments of the proposed apparatus, to the input of the band-pass filter 34. In this embodiment the output 42 of the meter 38 may be also connected, as in the embodiment shown in FIG. 11, to the electromechanical regulator 43 for feeding fuel to the injector 29.

Figure 13:
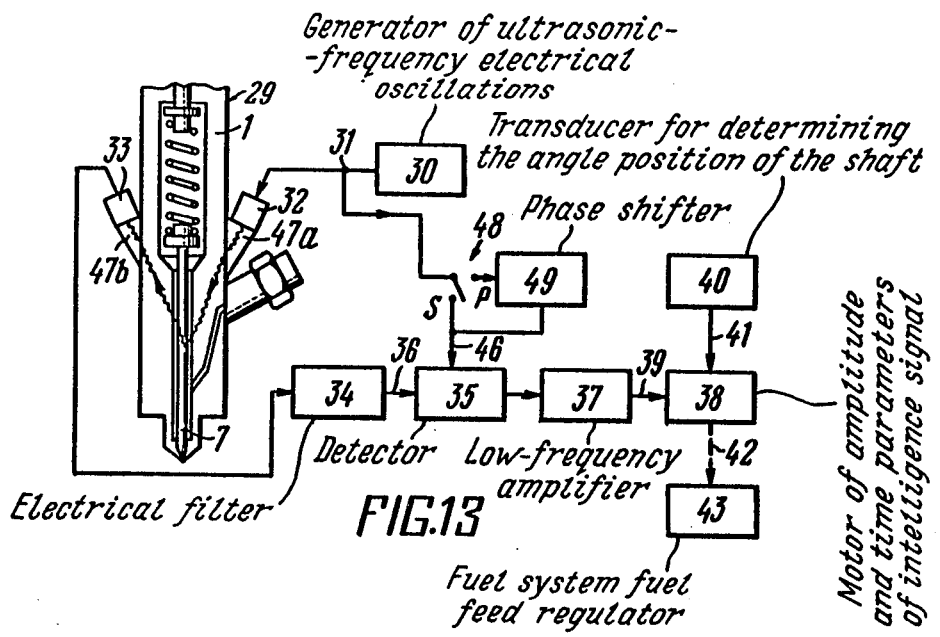
FIG. 13 illustrates the block-diagram of still another embodiment of the proposed apparatus comprising a phase detector according to the present invention.

In another embodiment of the proposed apparatus shown in FIG. 13 the detector 35 has an additional input 46, and the output 31 of the generator 30 is connected to the input 46 of the detector 35 which in this case is designed as a phase detector. In this embodiment the proposed apparatus ensures monitoring of the performance characteristics of the injector 29 in that case when tracing of the motion of, for example, the upper end of its needle 7 is accomplished with the use of the ultrasonic mechanical oscillations reflected from the needle 7 and when the phase modulation of these oscillations takes place. In this case the transmitting electromechanical converter 32 and the receiving electromechanical converter 33 are arranged on the injector 29 via acoustic prisms 47, the prism 47a ensuring the propagation of the ultrasonic mechanical oscillations in the direction toward the upper end portion of the needle 7, and the prism 47b ensuring the reception of these oscillations reflected from the needle 7.

As is shown in the drawing, the output 31 of the generator 30 is connected to the input 46 of the detector 35 by a switch 48, with the position "s" of the switch 48 the generator 30 being connected to the detector 35 directly, and with the position "p" of the switch 48 the generator 30 being connected to the detector 35 by a phase shifter 49 which is another aspect of the present invention. The phase shifter 49 ensures the optimum coordination of the phase of the signal of the generator 30 with the changing phase of the signal supplied to the detector 35 from the receiving path. The phase shifter 49 represents a reactive element with adjustable parameters, which is capable to change the phase of the signal of the generator 30 in the range of ±90° at the frequency of this signal. In this embodiment of the proposed apparatus the output 42 of the meter 38 may be also connected just as in its embodiment shown in FIG. 11 and FIG. 12, to the electromechanical regulator 43 for feeding fuel to the injector 29.

Figure 14:
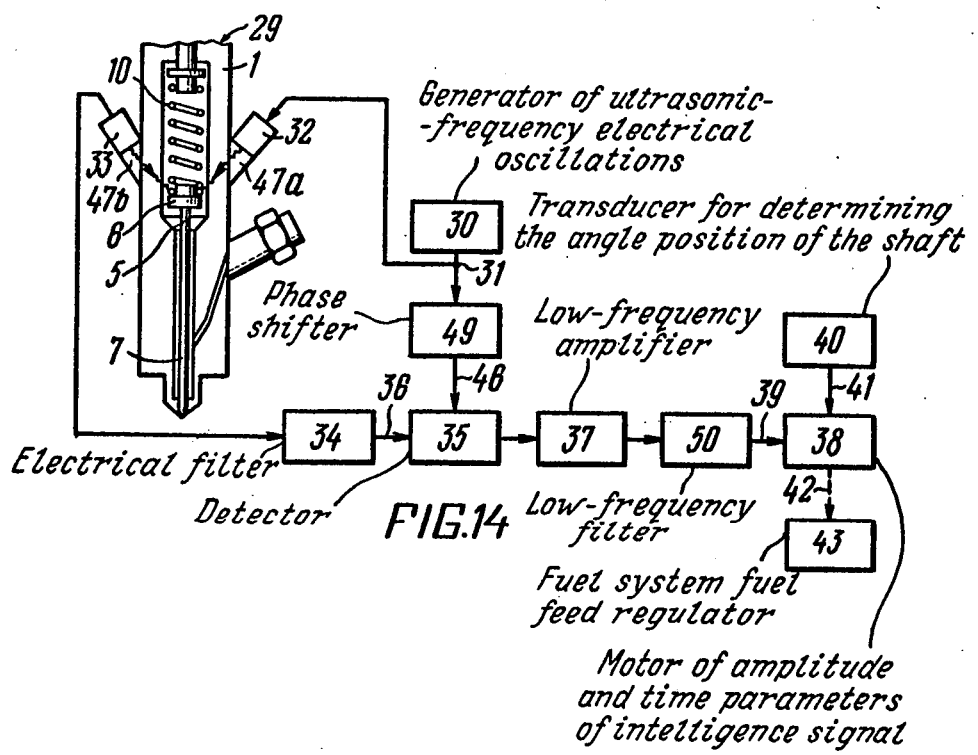
FIG. 14 illustrates the block-diagram of still another embodiment of the proposed apparatus comprising a low-frequency band-pass filter according to the present invention.

In another embodiment of the proposed apparatus shown in FIG. 14 the output of the low-frequency amplifier 37 is connected to the input 39 of the meter 38 by a low-frequency band-pass transmitting filter 50 for the isolation from the spectrum of the intelligence signal of some separate area of this spectrum which is occupied by the frequencies of, for example, some particular oscillations of the chosen moving element. The band-pass filter 50 represents a resonance filter which is capable of frequency re-tuning. In this embodiment the output 42 of the meter 38 may be also connected to the electromechanical fuel feed regulator 43.

In each of the above-described embodiments of the proposed apparatus for monitoring the performance of the mechanisms the meter 38 may be designed as a means for measuring the level of the intelligence signal. In the simplest case in the capacity of such a measuring means use may be made of a conventional electromeasuring device of the pointer type reacting to the value of the amplitude of the intelligence signal, as is shown in FIG. 15. It is evident that in this case use may be also made of suitable measuring means of other types.

In the capacity of the meter 38 use may be also made of an oscillographic device, as is shown in FIG. 16. The oscillograph used in this case ensures the indication of the shape of the intelligence signal on the screen thereof, as well as the measuring of the amplitude-time parameters of this signal, on the basis of which are determined all the principal parameters of the injection of fuel by the injector 29.

Furthermore, in the capacity of the meter 38 use may be also made of a stroboscopic device which is shown in FIG. 17 and which ensures the visual determination of the angle of the advance of the injection of fuel by the injector 29. This device comprises a pulse shaper 51 whose input is connected to the output of the low-frequency filter 37 and output is connected to the corresponding electrodes of a stroboscopic lamp 52 provided with a reflector 53. On the flywheel 54 of the engine there is made a movable mark 55 rotating together with the flywheel, while on the body 56 of the engine there is made a stationary mark 57 located in the centre of a scale 58 calibrated to read in the angles of rotation of the crankshaft 59 of the engine. The movable mark 55 is made on the edge of the flywheel 54 at such a point that at the time of the arrival of the piston 18 at the top dead centre this mark is located opposite the stationary mark 57.

The operation of the proposed apparatus for monitoring the performance of internal combustion engine mechanisms according to the present invention is proceeding as follows.

After supplying to the apparatus (FIG. 10) of feeding electrical voltages from a suitable power source (not shown) the generator 30 begins to generate continuous sinusoidal electrical oscillations with a frequency lying in the ultrasonic range and equal to about one megahertz. These oscillations from the output 31 of the generator 30 are supplied to the input of the transmitting electromechanical converter 32 rigidly secured to the body 1 of the injector 29 of the operating diesel engine, which is shown in the drawing only partially. The transmitting electromechanical converter 32 generates ultrasonic mechanical oscillations which are propagating in the direction of the rod 5 performing reciprocating motions, namely, in the direction of its upper end portion with the annular projection 6 having a complex geometrical configuration. The ultrasonic mechanical oscillations passing through the body 1 of the injector 29 and through the end portion of the moving rod 5 are received by the receiving electromechanical converter 33 and converted by it into an electrical signal. The motion performed by the rod 5 causes the phase-amplitude modulation of the ultrasonic mechanical oscillations passing through the injector 29 since during the motion performed by the rod 5 these oscillations experience different attenuation as a consequence of the shadow effect and envelope the rod 5 in a different manner. However, in this case there takes place mainly the amplitude modulation. Accordingly, the electrical signal generated by the receiving electromechanical converter 33 will experience the same type of modulation.

The spectrum of the obtained electrical signal includes, as was stated hereinabove, not only the area F (see also FIG. 3) with the central carrier frequency $F_c$ equal to the frequency of the electrical oscillations of the generator 30, but also the area G occupied by the frequencies of of the oscillations which are caused by the vibration the injector 29 and imparted to its body 1 by the vibration of the other mechanisms of the operating engine and which represent an interference. For this reason for the elimination of these interfering frequencies the obtained electrical signal from the output of the receiving electromechanical converter 33 is supplied to the input of the electrical band-pass filter 34. The band-pass transmitting filter 34 tuned to the central frequency of 1 megahertz (that is, to the frequency of the generator 30) and having the width of the transmission band equal to 40 kilohertz, which corresponds to the width of the spectrum of the modulation of the central frequency of the obtained electrical signal, isolates this carrier frequency together with the spectrum of the modulation and suppresses all the rest frequencies of the spectrum of this signal.

The signal of the isolated carrier frequency from the output of the band-pass filter 34 is supplied to the input 36 of the detector 35 representing in this case an amplitude detector. The amplitude detector 35 isolates from the supplied signal its low-frequency envelope representing an intelligence signal, whose shape carries all the pertinent information about the dynamics of the motion performed by the rod 5. From the output of the detector 35 the intelligence signal is supplied to the input of the low-frequency amplifier 37 which does the amplification of only the variable components of this signal. From the output of the low-frequency amplifier 37 the intelligence signal is supplied to the input 39 of the meter 38 of the amplitude and time parameters of the intelligence signal, that is, the amplitude of the pulse A (see also FIG. 2d) of the useful injection and the amplitude of the pulses B and C of secondary injections, as well as the length of these pulses and the time intervals therebetween.

From the parameters of the intelligence signal measured by the meter 38 with the help of the proposed apparatus determined are, as was described hereinabove, the principal parameters of the injection of fuel by the injector 29 and on their basis there is assessed the quality of injection, that is, the total volume of the fuel being injected, the distribution of the fuel being injected in time, the quality of spraying and so on. With the help of this embodiment of the proposed apparatus there may be also accomplished the monitoring of the performance of the cylinder-piston group, inclusive of the monitoring of the serviceability of the piston, piston rings and the inner surface of the side wall of the cylinder. It should be noted that in this case the proposed apparatus may be used in the capacity of the transducer of the angle position of the crankshaft of the engine, in particular, in the capacity of the transducer of the top dead centre of the piston, replacing a special transducer connected directly to the crankshaft of the engine. In the capacity of the transducer of the top dead centre the proposed apparatus will measure the time of the arrival of the piston at this center with a high degree of accuracy, since the measurements are made here directly on the piston and the measuring results are not affected by various errors involved in the usual measurement of this parameter and stemming from the curves in the crankshaft and other mechanical phenomena. Furthermore, this embodiment may find application for monitoring the performance and the serviceability of the rolling bearings having the shaft of the fuel pump arranged thereinside.

The operation of another embodiment of the proposed apparatus shown in FIG. 11 does not differ substantially from the operation of the embodiment of the apparatus just described hereinabove. The only difference consists in that in it the beginning time of the injection of fuel by the injector 29 is related to the time of the arrival of the piston at the top dead centre or to the time of the arrival of the piston at any other angle position. This is achieved by supplying the signal from the output of the transducer 40 of the angle position of the crankshaft of the engine to the input 41 of the meter 38. Such time synchronization of the operation of the meter 38 makes it possible to determine the angle of the advance of fuel injection during the monitoring the performance of the injector. The foregoing angle is determined by means of measuring the time interval (FIG. 2e) or the angle difference between the leading edge of the pulse A and the indication E, corresponding to it.

The embodiment of the proposed apparatus shown in FIG. 12 finds application in that case when tracing of the character of the motion performed by the chosen moving element of the mechanism being monitored is accomplished with the use of the resonance properties of the above mechanism. In this embodiment the electrical oscillations having a constant frequency and generated by the generator 30 are supplied from its output 31 to the receiving-transmitting electromechanical converter 45 by the resistive member 44. During the periodic motions performed by the rod 5 of the injector 29 there take place, as was stated hereinabove, changes in the mechanical impedance of this injector over a fairly wide range, which result in changes in the load applied to the generator 30, that is, changes in its load current leading to a change in the voltage drop across the resistive member 44. Such changes in the voltage across the resistive member 44 bring about the modulation of the electrical oscillations of the generator 30. The electrical oscillations of the generator 30 modulated thus are supplied then, just as in all the other embodiments of the proposed apparatus, to the input of the band-pass filter 34 and passed further to the rest elements of the apparatus.

It should be noted that the possibility of employing only one electromechanical converter facilitates considerably the selection of potential arrangement sites of the converter on the injector 29 of the engine, on whose body there is usually a multitude of various obstructive projections and other mechanisms and their parts arranged thereon. In this case, furthermore, the construction of the monitoring apparatus is simplified and it also becomes much more convenient in use, particularly while testing the diesel engines with a power less than 50 h.p. However, the sensitivity exhibited by the apparatus according to said embodiment is somewhat lower as compared with the sensitivity which may be achieved in the other embodiments of the proposed apparatus.

The embodiment of the proposed apparatus shown in FIG. 13 may find application in that case when the ultrasonic mechanical oscillations received by the electromechanical converter 33 mainly experience the phase modulation. In this case the signal generated by the generator 30 is supplied not only to the transmitting electromechanical converter 32, but also is supplied from its output 31 by the switch 48 to the input 46 of the detector 35. The detector 35 operates in this case as a phase detector and the signal of the generator 30 supplied to its input 46 acts as a reference signal of such a detector.

In the position "s" of the switch 48 the reference signal from the generator 30 is supplied to the input 46 of the detector 35 directly, and in the position "p" of the above switch 48, by the phase shifter 49. By supplying the reference signal to the detector 35 by the phase shifter 49 there is ensured the possibility of shifting the phase of this signal in relation to the phase of the modulated signal supplied into the detector 35 to its input 36. The possibility of shifting the phase of the reference signal ensures in turn the possibility of bringing out the operational area of the characteristic of the phase detector to the area of this characteristic having a maximum slope. The operation of the detector 35 in the area of the characteristic with the maximum slope enables one to enhance the sensitivity of the apparatus, to increase the signal-noise ratio and to improve thereby the measuring accuracy.

The use of the phase shifter 49 in the circuit of the proposed apparatus for monitoring seems to be particularly expedient in those cases when this apparatus is to be utilized for monitoring the performance of the injectors 29 of various types as well as the injectors 29 mounted in the engines of various types, and when because of the arrangement of the converters 32 and 33 each time at a different site the detector 35 may operate in some particular case in the area of its characteristic with a small slope, which may result in the reduction of the measuring accuracy.

It should be noted that in this embodiment of the proposed apparatus use may be made of two separate electromechanical converters 32 and 33 as well as of one electromechanical converter combining in itself the functions of both said converters. Thus, the incorporation of the phaseshifter 49 into the circuit for supplying the reference signal to the phase detector 35 makes it possible to reduce the requirements imposed on the arrangement site of the transmitting electromechanical converter 32 and the receiving electromechanical converter 33, as well as the requirements imposed on these converters themselves.

With the advent of the situations when the artificial ultrasonic mechanical oscillations generated by the transmitting converter 32 are applied simultaneously, for example, because of the peculiarities in the construction of the engine and of the mechanism being monitored, to its two moving elements, the ultrasonic mechanical oscillations received by the converter 33 become modulated as a consequence of the motion performed by both said elements. If the characters of the motion, or, in other words, the frequencies of the oscillations performed by such elements are different then it is necessary to isolate from the spectrum of the modulation of the intelligence signal that area which characterizes the motion performed by some one element which is of interest. To such a situation corresponds the case which is illustrated by FIG. 14 wherein is shown that the bundle of the artificial ultrasonic mechanical oscillations is directed in the injector 29 to the contact point between the annular stop projection 6 of the rod 5 and the spring 10. Upon the operating conditions of the engine the spectrum of the oscillating motions of the spring 10 is different from the spectrum of such motions of the rod 5 and occupies, for example, for the above-mentioned D-50 engine, the area lying beneath 100 hertz, while the spectrum of the motions of the rod 5 connected to the needle 7 occupies the area lying above 100 hertz. If in the case described the need should arise to obtain the information pertaining only to the motion performed by the rod 5 (for example, in order to determine the parameters of the injection of fuel by the injector 29), then the band-pass filter 50 is tuned with the help of suitable means to the transmission of only such frequencies which exceed 100 hertz, the frequencies lower than 100 hertz, inclusive of the low-frequency harmonics of the signals deteriorating the slope of the edges of the pulses of the intelligence signal being suppressed to the desired degree. Thus the low-frequency band-pass filter 50 cleans the intelligence signal of its components carrying the undesired information and improves thereby the value of the signal-noise ratio. The component isolated by the filter 50 characterizing only the motion performed by the rod 5 is supplied from its output to the input 39 of the meter 38.

The re-tunable low-frequency band-pass filter 50 may be also utilized during the above-described monitoring of the performance of the injector 29 where upon starting up the engine there is determined the mobility displayed by the needle 7, this case being illustrated by the time diagrams shown in FIG. 4. In the case being considered, as was stated hereinabove, the oscillations performed by the needle 7 (FIG. 14) with good mobility have a frequency of about 1000 hertz or somewhat higher, and for this reason the low-frequency transmitting filter 50 is tuned to a certain frequency band with a low frequency equal to 1000 hertz. As a result of this, if the mobility displayed by the needle 7 is unsatisfactory and, consequently, the frequency of its oscillations lies beneath the low frequency of the transmission band of the filter 50, then the signal is absent at the output of this filter, while if the mobility displayed by the needle 7 is satisfactory, then the signal is present at the output of the filter 50 which is supplied subsequently to the input 39 of the meter 38 for carrying out appropriate measurements.

Furthermore, the low-frequency band-pass filter 50 may be also utilized for a more comprehensive analysis of the peculiarities of this or that component of the intelligence signal during the above-described monitoring of the serviceability of the rolling bearing 24 (FIG. 8) as well as of the shaft 23 of the fuel pump 26 arranged thereinside. In this case, as may be seen from the time diagram shown in FIG. 9, the intelligence signal has the components sharply differing in frequency one from another and for this reason the isolation of any of these components does not present any special difficulties.

The application of the low-frequency band-pass filter 50 (FIG. 14) makes it possible in some cases to use successfully in the capacity of the meter 38 a simple electromeasuring device which is shown in FIG. 15 and which does the measuring of the level of the intelligence signal. For example, in the case of determining the mobility displayed by the needle 7 of the injector 29, or in the case of determining the serviceability of the rolling bearing. The possibility of using such a device results first of all from the fact that the frequency of the oscillating motions of the elements varies in such cases over a fairly small range. For this reason the value of the level of the intelligence signal with quite an acceptable degree of accuracy determines a corresponding degree of the mobility displayed by the needle 7 in the case mentioned first, and a degree of the wobbling experienced by the elements of the rolling bearing 24 (FIG. 8) and of the shaft 23 arranged therein side in the case mentioned second.

The application of the oscillographic device shown in FIG. 16 in the capacity of the meter 38 is fairly effective in the proposed apparatus generating a sharply defined intelligence signal. The oscillograph allows one to obtain the most comprehensive and illustrative information about the motion performed by the chosen moving element of the mechanism being monitored an in fairly distinct form. In that case when use is made of a one-beem oscillograph and the injection of fuel by the injector 29 is monitored, the signal from the transducer 40 of the angle position of the crankshaft of the engine is supplied to the input 41 of the meter 38, representing in this case the input of a horizontal sweep means of the oscillograph, while the intelligence signal is supplied from the low-frequency amplifier 37 to the input 39 of the meter 38 representing the input of a vertical deflection amplifier of the oscillograph. With such external starting of the oscillograph's sweep the time interval between the beginning of the sweep and the leading edge of the pulse of the intelligence signal represents the advance of fuel injection. In the case when it is necessary to examine in detail the shape of this or that pulse of the intelligence signal use may be made of external starting of the oscillograph's sweep. In that case when use is made of a double-beam oscillograph, whose screen is shown in FIG. 16 and when the performance of the injector 29 is also monitored, the intelligence signal is supplied to the input of an amplifier of the channel of some one of these beams, and the signal from the transducer 40 is supplied either to the input of an amplifier of the channel of the other beam, or to the input of the oscillograph's sweep means. Then, by the image of the intelligence signal on the screen of the oscillograph there is accomplished a visual examination of the motion performed by the chosen moving element, and by means of a measuring device built into the oscillograph the amplitude and time parameters of this signal are measured. On the basis of the measurements obtained as well as of the visual examination of the intelligence signal there are determined the principal performance characteristics of the injector 29 being monitored.

If in the proposed apparatus in the capacity of the meter 38 use is made of the stroboscope shown in FIG. 17, then the intelligence signal from the output of the low-frequency amplifier 37 is supplied to the input of the shaper 51. The shaper 51 operates by the leading edge of the main pulse of the intelligence signal and generates a rectangular pulse of a preassigned length and amplitude which is supplied to the stroboscopic lamp 52 and periodically ignites it with the frequency of the repetition of the pulse of the intelligence signal. The periodic flashes of light from the stroboscopic lamp 52 are directed by means of the reflector 53 in a narrow beam to that place of the body 56 of the engine where the scale 58 with the central stationary mark 57 are located, the beam of light also falling on the edge of the flywheel 54 having the movable mark 55 rotating together with this flywheel. Upon periodic lighting by the lamp 52 of the movable mark 55 and the stationary mark 57, which is done with a frequency equal to the frequency of rotation of the crankshaft 59, both these marks seem to be stationary as a consequence of the stroboscopic effect. From the angle distance between the movable mark 55 and the stationary mark 57 determined by means of the scale 58 is the angle of the advance of the injection of fuel by the injector 29 in relation to the top dead centre of the piston 18. Taking into consideration the measured value of the angle distance, the operator carries out then the required adjustment of the time of fuel injection.

The embodiment of the proposed apparatus wherein as the meter 38 use is made of the stroboscope having a simpler construction as compared with the other embodiments thereof since in this case there is discarded the transducer 40 of the angle position of the crankshaft, the electronic unit for determining and indicating the angle of the advance of fuel injection and their connecting wiring. The power consumed and the dimensions of the apparatus in this embodiment are also insignificant. The operation of the apparatus does not require in this case any special training of the operating personnel since in the process of using the apparatus the operator does not perform manipulations with the controls of the electronic equipment. This is why this specific embodiment of the proposed apparatus is especially convenient in use while monitoring the performace of the fuel system of the engine upon conducting scheduled maintenance and repair directly in the process of the operation of a transport facility having this engine mounted thereon.

Many of the above-described embodiments of the proposed apparatus allow connection of the input 42 (FIGS. 11 to 14) of the meter 38 to the regulator 43 for feeding fuel to the injector 29 incorporated in the fuel system of the engine, which permits to accomplishing automatic controlling of the injection of fuel and, hence, the operation of the engine in the preassigned optimum conditions. The possibility of the above connection of the meter 38 results from the fact that the proposed apparatus ensures the possibility of determining all the principal parameters of the injection of fuel, namely, the duration of fuel injection, the angle of injection advance and the frequency of injection repetition and also the time of the occurrence and the duration of secondary injections.

The above-disclosed method of monitoring the performance of internal combustion engine mechanisms and the apparatus for practicing the foregoing method feature the following advantages as compared with the known ones.

First of all, it should be pointed out that the proposed method and apparatus owing to the possibility provided by them to identify the exhaustive character of all the operational and undesired motions performed by the chosen moving element of the mechanism being monitored, causing the functional operation of this mechanism allows one to determine highly accurately all of the principal performance characteristics of the mechanism.

The proposed apparatus offers a sufficiently simple design which does not require the use of unconventional special elements in it and ensures its extended and highly reliable service life as well as convenience in operation. Thus, the installation of the electromechanical converters on the body of the mechanism being monitored takes a very short period of time from one to two minutes, while the procedure of examining, for example, of the injectors in order to find out the injectors with satisfactory mobility of the needle and the injectors with unsatisfactory mobility of the needle takes about from two to three minutes for one injector.

Moreover, the proposed method and apparatus offer unprecedented versatility since they may be utilized for monitoring the performance of any mechanism having moving elements arranged thereinside and mounted on any engine. For different mechanisms use is made of only different means for securing the electromechanical converters. The proposed method and apparatus make it possible to carry out not only the monitoring of the performance of a particular mechanism, but also the assessment of the serviceability as well as the trouble-shooting of mechanisms.

It should be also noted that the proposed method allows one to accomplish the simultaneous tracing of the motion performed by a few moving elements of some mechanism, particularly those having different frequencies of their motions. In this case for each moving element use is made of separate electromechanical converters. In the case when the frequencies of the motions performed by the elements are comparable to the transmitting electromechanical converters of different elements may be delivered, for example, ultrasonic mechanical oscillations with different frequencies distinguished to the required extent, and then use may be made of the frequency separation of the ultrasonic oscillations received and converted into an electrical signal. All this taken together permits one to extensively utilize the proposed method and apparatus for monitoring the performance of internal combustion engine mechanisms both at the plants manufacturing engines and fuel equipment and at the place of operation or repair of the engines.

Hereinabove have been described various embodiments of the present invention admitting of modifications and additions which are quite apparent to those skilled in the art to which the present invention is related. Accordingly, the present invention is not to be in the least limited by the foregoing description of the proposed method or apparatus for monitoring the performance of internal combustion engine mechanisms, and any modifications and additions can be easily introduced into the present method and apparatus without departing from the spirit and scope of the invention defined in the appended claims.

What is claimed is:

1. A method of monitoring the performance of the mechanisms of an internal combustion engine incorporating a cylinder with a piston, an injector and a fuel pump, comprising the following steps:

applying continuous artificial ultrasonic mechanical oscillations across the body of a mechanism being monitored to the chosen moving element of said mechanism, receiving and converting into an electrical signal the ultrasonic mechanical oscillations arriving from said moving element of said mechanism being monitored, arising from the interaction of said artificial ultrasonic mechanical oscillations with moving element and modulated as a consequence of the motion performed by said moving element, said steps of receiving and converting being accomplished by a means for receiving and converting arranged on the body of said mechanism being monitored, isolating a band of frequencies of said electrical signal with a carrier frequency equal to the frequency of said artificial ultrasonic mechanical oscillations, detecting said isolated carrier frequency of said electrical signal to obtain its low-frequency modulating component characterizing the motion of said moving element in relation to said body of said mechanism being monitored and representing an intelligence signal, measuring the spectral-time parameters of said ultrasonic mechanical oscillations received from said moving element accomplished by means of processing said inteligence signal, and determining the required performance characteristics of said mechanism being monitored on the basis of said measured parameters.

2. A method as recited in claim 1, wherein said steps of receiving and converting are accomplished for said modulated ultrasonic oscillations passed through said mechanism being monitored with said chosen moving element located thereinside.

3. A method as recited in claim 2, wherein said artificial ultrasonic oscillations are applied to the end portion of the rod of said injector.

4. A method as recited in claim 2, wherein said artificial ultrasonic oscillations are applied to the spring of said injector.

5. A method as recited in claim 2, wherein said artificial ultrasonic oscillations are applied to the rolling bearing having the shaft of said fuel pump arranged thereinside.

6. A method as recited in claim 1, wherein said steps of receiving and converting are accomplished for said modulated ultrasonic oscillations reflected from said chosen moving element located inside said mechanism being monitored.

7. A method as recited in claim 6, wherein said artificial ultrasonic oscillations are applied to the end portion of the needle of said injector.

8. A method as recited in claim 7, wherein said artificial ultrasonic oscillations are applied to said chosen moving element of said mechanism being monitored in the course of the starting operation of the engine.

9. A method as recited in claim 6, wherein said artificial ultrasonic oscillations are applied to the bottom of said piston located inside said cylinder.

10. A method as recited in claim 6, wherein said artificial ultrasonic oscillations are applied to the side wall of said piston located inside said cylinder.

11. A method as recited in claim 1, wherein said steps of receiving and converting are accomplished for said ultrasonic oscillations modulated as a consequence of variations in the mechanical impedance of said mechanism being monitored with said chosen moving element located thereinside.

12. A method as recited in claim 1, wherein said artificial ultrasonic oscillations are applied to the side wall of said piston located inside said cylinder.

13. A method as recited in claim 1, wherein said artificial ultrasonic oscillations are applied to the rolling bearing having the shaft of said fuel pump arranged thereinside.

14. An apparatus for monitoring the performance of mechanisms of an internal combustion engine incorporating a cylinder with a piston, an injector and a fuel pump, comprising:
 a generator for generating continuous electrical oscillations of an ultrasonic range,
 a transmitting electromechanical converter which is adapted to be arranged on the body of the mechanism being monitored, capable of producing mechanical ultrasonic oscillations propagating in the direction toward the chosen moving element of said mechanism being monitored, and connected to the output of said generator,
 a receiving electromechanical converter adapted to be arranged on the body of said mechanism being monitored and capable of receiving the ultrasonic mechanical oscillations arriving from said chosen moving element of said mechanism being monitored and modulated as a consequence of the motion performed by said chosen moving element, and generating corresponding electrical oscillations of an ultrasonic range comprising an intelligence signal characterizing the motion performed by said moving element of said mechanism being monitored,
 an electrical band-pass filter having its input connected to the output of said receiving electromechanical converter and serving for the isolation from the spectrum of the electrical oscillations generated by said receiving electromechanical converter of an area occupied by said intelligence signal with a carrier frequency being equal to the frequency of the electrical oscillations of said generator,
 a detector having its input connected to the output of said electrical band-pass filter and serving for the isolation of said intelligence signal,
 a low-frequency amplifier having its input connected to the output of said detector and providing amplification of said isolated intelligence signal,
 a meter of the amplitude and time parameters of said intelligence signal, whose input is connected to the output of said low-frequency amplifier.

15. An apparatus as recited in claim 14, comprising further:
 a transducer for determining the angle position of the crankshaft of the engine,
 said meter being provided with another input intended for receiving a signal of time synchronization of said meter,
 the output of said transducer being connected to said another input of the said meter.

16. An apparatus as recited in claim 15, comprising further:
 a resistive member,
  said receiving electromechanical converter and said transmitting electromechanical converter being combined into a single receiving-transmitting electromechanical converter performing simultaneously the functions of said receiving and said transmitting electromechanical converters, and
 said single receiving-transmitting electromechanical converter being connected to the output of said generator by said resistive member.

17. An apparatus as recited in claim 15, wherein said detector represents an amplitude detector and isolates the amplitude modulating envelope of the electrical oscillations obtained.

18. An apparatus as recited in claim 15, wherein said detector represents a phase detector and isolates said intelligence signal representing variations in the signal phase difference of said generator and said obtained electrical oscillations, said detector being provided with another input connected to the output of said generator.

19. An apparatus as recited in claim 18, comprising further a phase shifter connected between the output of said generator and said another input of said detector.

20. An apparatus as recited in claim 19, comprising further a fuel feed regulator ensuring the control of fuel injection by said injector and connected to the output of said meter.

21. An apparatus as recited in claim 18, comprising further a low-frequency band-pass filter intended for the isolation from the spectrum of said intelligence signal of a separate area of this spectrum and connected between the output of said low-frequency amplifier and the input of said meter.

22. An apparatus as recited in claim 18, wherein said meter represents an oscillographic device for indicating the shape and measuring the length and phase of said intelligence signal.

23. An apparatus as recited in claim 18, wherein said meter represents a stroboscope intended for determining the beginning time of said intelligence signal in relation to the time of the arrival of said piston at the preassigned position.

24. An apparatus as recited in claim 14, comprising further:
 a resistive member,
 said receiving electromechanical converter and said transmitting electromechanical converter being combined into a single receiving-transmitting electromechanical converter performing simultaneously the functions of said receiving and said transmitting electromechanical converters, and
 said single receiving-transmitting electromechanical converter being connected to the output of said generator by said resistive member.

25. An apparatus as recited in claim 14, wherein said detector represents an amplitude detector and isolates the amplitude modulating envelope of the electrical oscillations obtained.

26. An apparatus as recited in claim 25, comprising further a low-frequency band-pass filter intended for the isolation from the spectrum of said intelligence signal of a separate area of this spectrum and connected between the output of said low-frequency amplifier and the input of said meter.

27. An apparatus as recited in claim 26, wherein said meter represents a means for measuring the level of said intelligence signal.

28. An apparatus as recited in claim 14, wherein aid detector represents a phase detector and isolates said intelligence signal representing variations in the signal phase difference of said generator and said obtained electrical oscillations, said detector being provided with another input connected to the output of said generator.

29. An apparatus as recited in claim 28, comprising further a phase shifter connected between the output of said generator and said another input of said detector.

30. An apparatus as recited in claim 28, wherein said meter represents as oscillographic device for indicating the shape and measuring the length and phase of said intelligence signal.

* * * * *